United States Patent
Miller et al.

(10) Patent No.: US 9,460,542 B2
(45) Date of Patent: Oct. 4, 2016

(54) BROWSER-BASED COLLABORATIVE DEVELOPMENT OF A 3D MODEL

(71) Applicant: TRIMBLE NAVIGATION LIMITED, Sunnyvale, CA (US)

(72) Inventors: Tyler Miller, Denver, CO (US); Scott Lininger, Lafayette, CO (US); Preston Jackson, Longmont, CO (US)

(73) Assignee: Trimble Navigation Limited, Sunnyvale, CA (US)

(*) Notice: Subject to any disclaimer, the term of this patent is extended or adjusted under 35 U.S.C. 154(b) by 334 days.

(21) Appl. No.: 13/676,330

(22) Filed: Nov. 14, 2012

(65) Prior Publication Data
US 2013/0120368 A1    May 16, 2013

Related U.S. Application Data

(60) Provisional application No. 61/560,205, filed on Nov. 15, 2011.

(51) Int. Cl.
*G06T 15/00* (2011.01)
*G06T 19/00* (2011.01)

(52) U.S. Cl.
CPC .............. *G06T 15/00* (2013.01); *G06T 19/00* (2013.01); *G06T 2219/024* (2013.01)

(58) Field of Classification Search
CPC . G06T 15/00; G06T 2219/024; G06T 19/00; G06T 17/00; G06F 2217/04; H04L 67/02; H04L 43/10; H04L 67/42; H04L 41/0813; H04M 11/00
USPC .......................................................... 345/419
See application file for complete search history.

(56) References Cited

U.S. PATENT DOCUMENTS 6,058,397 A    5/2000  Barrus et al.
6,158,903 A *  12/2000 Schaeffer et al. ............. 709/204

(Continued)

FOREIGN PATENT DOCUMENTS

CA    2781638    6/2011
EP    0899695    3/1999

(Continued)

OTHER PUBLICATIONS

International Search Report and Written Opinion for International (PCT) Patent Application No. PCT/US2012/064932, mailed Mar. 22, 2013 11 pages.
International Search Report for International (PCT) Patent Application No. PCT/US2012/064926, mailed Mar. 29, 2013 3 pages.
International Preliminary Report on Patentability for International (PCT) Patent Application No. PCT/US2012/064926, mailed May 30, 2014 6 pages.
International Search Report and Written Opinion for International (PCT) Patent Application No. PCT/US2012/064931, mailed Mar. 13, 2013 9 pages.

(Continued)

*Primary Examiner* — Gregory J Tryder
*Assistant Examiner* — Yuehan Wang
(74) *Attorney, Agent, or Firm* — Sheridan Ross P.C.

(57) ABSTRACT

A system for collaborative three-dimensional (3D) modeling in a browser application is stored as instructions on a computer-readable medium. The instructions include a browser interface module that executes on the one or more processors to receive user commands from the browser application for modifying a 3D model and cause a rendering of the 3D model to be displayed in a window controlled by the browser application. The instructions further include a modeling engine module that executes on the one or more processors to interpret model data corresponding to the 3D model to generate the rendering of the 3D model, and modify the model data in accordance with the received user commands. Still further, the instructions include a collaboration module that executes on the one or more processors to cause the modified 3D model to be synchronized in real time.

21 Claims, 10 Drawing Sheets

(56) References Cited

U.S. PATENT DOCUMENTS

| | | | |
|---|---|---|---|
| 7,092,907 | B2 | 8/2006 | Kanevsky et al. |
| 7,139,444 | B2 | 11/2006 | Ameline et al. |
| 7,200,639 | B1 | 4/2007 | Yoshida |
| 7,516,132 | B1 | 4/2009 | Fast et al. |
| 7,917,584 | B2 * | 3/2011 | Arthursson .................. 709/205 |
| 2002/0069215 | A1 | 6/2002 | Orbanes et al. |
| 2002/0154144 | A1 | 10/2002 | Lofgren et al. |
| 2003/0021439 | A1 | 1/2003 | Lubin et al. |
| 2003/0135557 | A1 | 7/2003 | Davis |
| 2004/0068187 | A1 | 4/2004 | Krause et al. |
| 2004/0153824 | A1 | 8/2004 | Devarajan et al. |
| 2004/0239679 | A1 | 12/2004 | Ito et al. |
| 2005/0081161 | A1 | 4/2005 | MacInnes et al. |
| 2005/0131659 | A1 | 6/2005 | Mei et al. |
| 2005/0165859 | A1 | 7/2005 | Geyer et al. |
| 2005/0171790 | A1 | 8/2005 | Blackmon |
| 2006/0066609 | A1 | 3/2006 | Iodice et al. |
| 2006/0119601 | A1 | 6/2006 | Finlayson et al. |
| 2006/0250418 | A1 | 11/2006 | Chartier et al. |
| 2007/0174027 | A1 | 7/2007 | Moiseyev |
| 2008/0028323 | A1 | 1/2008 | Rosen et al. |
| 2008/0046828 | A1 | 2/2008 | Bibliowicz et al. |
| 2008/0140732 | A1 | 6/2008 | Wilson et al. |
| 2008/0141334 | A1 | 6/2008 | Wicker et al. |
| 2008/0229234 | A1 | 9/2008 | Astolfi et al. |
| 2009/0046094 | A1 | 2/2009 | Hamilton, II et al. |
| 2009/0077119 | A1 | 3/2009 | Speth et al. |
| 2009/0141023 | A1 | 6/2009 | Shuster |
| 2009/0237411 | A1 | 9/2009 | Gossweiler et al. |
| 2010/0013842 | A1 | 1/2010 | Green et al. |
| 2010/0017461 | A1 | 1/2010 | Kokkevis et al. |
| 2010/0030578 | A1 | 2/2010 | Siddique et al. |
| 2010/0045662 | A1 | 2/2010 | Boothroyd et al. |
| 2010/0118039 | A1 | 5/2010 | Labour |
| 2010/0146085 | A1 | 6/2010 | Van Wie et al. |
| 2010/0198563 | A1 | 8/2010 | Plewe |
| 2011/0025688 | A1 | 2/2011 | Schneider et al. |
| 2011/0153368 | A1 | 6/2011 | Pierre et al. |
| 2011/0169826 | A1 | 7/2011 | Elsberg et al. |
| 2012/0054261 | A1 | 3/2012 | Evans et al. |
| 2012/0109591 | A1 | 5/2012 | Thompson et al. |
| 2012/0117145 | A1 | 5/2012 | Clift et al. |
| 2012/0331061 | A1 | 12/2012 | Lininger |
| 2013/0035904 | A1 * | 2/2013 | Kuhn ................................ 703/1 |
| 2013/0120367 | A1 | 5/2013 | Miller et al. |
| 2013/0120369 | A1 | 5/2013 | Miller et al. |
| 2013/0132466 | A1 | 5/2013 | Miller et al. |
| 2013/0144566 | A1 | 6/2013 | De Biswas |
| 2014/0033265 | A1 | 1/2014 | Leeds et al. |

FOREIGN PATENT DOCUMENTS

| | | |
|---|---|---|
| EP | 1004068 | 5/2000 |
| EP | 2352120 | 8/2011 |
| JP | 2001-229401 | 8/2001 |
| JP | 2003-099805 | 4/2003 |
| JP | 2005-269280 | 9/2005 |
| WO | WO 2008/041061 | 4/2008 |
| WO | WO 2010/035266 | 4/2010 |

OTHER PUBLICATIONS

International Preliminary Report on Patentability for International (PCT) Patent Application No. PCT/US2012/064931, mailed Jun. 5, 2014 6 pages.
International Preliminary Report on Patentability for International (PCT) Patent Application No. PCT/US2012/064932, mailed May 30, 2014 8 pages.
International Search Report and Written Opinion for International (PCT) Patent Application No. PCT/US2012/064940, mailed Mar. 26, 2013 9 pages.
International Preliminary Report on Patentability for Intenational (PCT) Patent Application No. PCT?US2012/064940, mailed May 30, 2014 8 pages.
International Search Report and Written Opinion for Application No. PCT/US2012/044297, dated Dec. 27, 2012.
International Preliminary Report on Patentability for International (PCT) Patent Application No. PCT/US2012/044297, mailed Jan. 16, 2014 8 pages.
Official Action for U.S. Appl. No. 13/159,705, mailed Jul. 16, 2013.
Official Action for U.S. Appl. No. 13/159,705 mailed Mar. 20, 2014.
Official Action for U.S. Appl. No. 13/676,323, mailed Mar. 24, 2015 63 pages.
Official Action for U.S. Appl. No. 13/676,340, mailed Jan. 6, 2015 20 pages.
Official Action for U.S. Appl. No. 13/169,705, mailed Oct. 21, 2014 12 pages.
"Collaborative real-time editor" Wikipedia, the free encyclopedia, Nov. 7, 2011, 7 pages [retrieved from: http://en.wikipedia.org/w/index.php?title=Collaborative_real-time_editor&oldid=459190583].
Agustina et al. "CoMaya," Proceedings of the ACM 2008 Conference on Computer Supported Cooperative Work, CSCW '08, Jan. 1, 2008, pp. 5-8, XP055163225, ISBN: 978-1-60-558007-4.
Chengzheng Sun et al. "Transparent adaptation of single-user applications for multi-user real-time collaboration," ACM Transactions on Computer-Human Interaction, Dec. 1, 2006, vol. 13, No. 4, pp. 531-582, XP055163216, ISSN: 1073-0516.
Koller et al. "Research Challenges for Digital Archives of 3D Cultural Heritage Models," ACM Journal on Computing and Cultural Heritage, Dec. 2009, vol. 2, No. 3, Article 7, 17 pages.
Ohbuchi et al. "Watermarking Three-Dimensional Polygonal Models," Proceedings of the Fifth ACRM Internal Conference on Multimedia, 1997, pp. 261-272.
Sohn et al. "User transparent 3D watermarking system based on security policy," International conference on Cyberworlds, Oct. 2007, pp. 89-92.
Yan Shaojin et al. "An asynchronous CAD collaborative design model," Computer Application and System Modeling (ICCASM), 2010 International Conference on, IEEE, Piscataway, NJ, USA, Oct. 22, 2010, pp. V6-563-V6-568, XP031789329, ISBN: 978-1-4244-7235-2.
Extended Search Report for European Patent Application No. 12849377.2, dated May 18, 2015 6 pages.
Extended Search Report for European Patent Application No. 12851259.7, dated May 4, 2015 6 pages.
Extended Search Report for European Patent Application No. 12850450.3, dated Jul. 15, 2015 8 pages.
Extended Search Report for European Patent Application No. 12804395.7, dated Jan. 28, 2015 12 pages.
Official Action for U.S. Appl. No. 13/676,323, mailed Sep. 16, 2015 76 pages.
Official Action for U.S. Appl. No. 13/676,340, mailed Aug. 12, 2015 28 pages.
Official Action for U.S. Appl. No. 13/676,338, mailed Mar. 31, 2015 38 pages.
Notice of Allowance for U.S. Appl. No. 13/676,338, mailed Aug. 12, 2015 12 pages.
Official Action for U.S. Appl. No. 13/169,705, mailed May 6, 2015 12 pages.
Notice of Allowance for U.S. Appl. No. 13/169,705, mailed Sep. 1, 2015 7 pages.
Ammon et al., "Collaboration on Scene Graph Based 3D Data," from Advances in Computer Graphics and Computer Vision: Int'l Conferences VISAPP and GRAPP 2006, Braz et al. (eds), Springer-Verlag, 2007, pp. 78-90.
Ku et al., "3D Model-Based Collaboration in Design Development and Construction of Complex Shaped Buildings," Itcon, 2008, vol. 13, pp. 458-485.
Extended European Search Report for European Patent Application No. 12850623.5, dated Dec. 3, 2015, 7 pages.

* cited by examiner

BROWSER-BASED COLLABORATIVE DEVELOPMENT OF A 3D MODEL

CROSS REFERENCE TO RELATED APPLICATIONS

This application claims the benefit of U.S. Provisional Patent Application No. 61/560,205, filed on Nov. 15, 2011, entitled "Browser-Based Collaborative Development of a 3D Model," the disclosure of which is hereby expressly incorporated herein by reference.

FIELD OF THE DISCLOSURE

This disclosure relates to developing a three-dimensional model of an object or a group of objects and, in particular, to collaboratively developing a model on a communication network using a web browser application.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, professional as well as non-professional users in a variety of different fields, such as engineering, architecture, automotive design, graphic design, advertising, fashion design, medicine, etc., can develop three-dimensional (3D) models of buildings, vehicles, and other objects using 3D modeling software that operates on a computing device. A user typically interacts with 3D modeling software via input devices such as a keyboard, mouse, trackball, and/or stylus, and the drafting document is displayed on a graphical display device, such as a computer monitor or screen.

In general, 3D modeling software allows a user to draw various three-dimensional shapes (directly or by defining two-dimensional faces that make up 3D shapes), apply colors and/or textures to the shapes, move, scale, rotate, and skew the shapes, etc. 3D modeling software typically provides the user with stock objects (e.g., 3D shapes such as spheres or parallelepipeds and/or two-dimensional (2D) shapes such as arcs, circles, rectangles, and other known geometric shapes) and/or provides tools to create such objects. Further, 3D modeling software typically allows users to save models as files that conform to a certain predefined format. To share models, users transmit to each other files with the corresponding model data, or upload the files to data servers.

Users usually develop 3D models by sequentially entering various drawing and image manipulation commands via a graphical user interface (GUI). For example, to model a two-story building, a user may first draw a four-wall structure, draw a door in one of the walls, then draw several windows in the walls, etc. The user may then paint or texture the walls, the roof, and other portions of the model. Accordingly, it may take a significant amount of time for a single user to develop a complex and detailed model.

Further, to modify an existing model, a user typically uses 3D modeling software to open a file that stores model data, edit the model data, and save the model data to the file. In order for another user to safely edit the model, he or she must make another copy of the file or wait until the user currently editing the model finishes the edits and closes the file. In other words, when more than one user contributes to the development of a model, 3D modeling software receives input from only one user at a time.

SUMMARY

In an embodiment, a tangible non-transitory computer-readable medium stores instructions for collaborative three-dimensional (3D) modeling in a browser application that executes on one or more processors of a first computing device. The instructions include a browser interface module that executes on the one or more processors to receive user commands from the browser application for modifying a 3D model and cause a rendering of the 3D model to be displayed in a window controlled by the browser application. The instructions further include a modeling engine module that executes on the one or more processors to interpret model data corresponding to the 3D model to generate the rendering of the 3D model, and modify the model data in accordance with the received user commands. Still further, the instructions include a collaboration module that executes on the one or more processors to cause the modified 3D model to be synchronized in real time between the first computing device and a second computing device at which the 3D model is being concurrently developed, where the first computing device and the second computing device operate independently of each other on a communication network.

In another embodiment a computing device for collaborative development of 3D models includes a network interface coupled to a communication network, one or more processors, a memory coupled to the one or more processors, a display device coupled to the one or more processors, a browser application stored in the memory that executes on the one or more processors to retrieve content from remote hosts via the communications network interface and render the retrieved content on the display device, and a 3D modeling software module stored in the memory that executes on the one or more processors. The 3D modeling software module includes a browser interface module configured to receive user commands from the browser application for modifying a 3D model and cause a rendering of the 3D model to be displayed in a window controlled by the browser application, a modeling engine module configured to modify model data corresponding to the 3D model in accordance with the received user commands, where the model data is stored in the memory in a non-image format, and a collaboration module configured to generate an indication of the modified model data to be transmitted via the communication network to cause the modified 3D model to be synchronized in real time with another computing device at which the 3D model is being concurrently developed.

In still another embodiment, a method for browser-based collaborative development of a 3D model is implemented in a computing device operating on a communication network and having a memory and one or more processors. Model data corresponds to the 3D model is stored in a non-image format in the memory, and the 3D model includes a plurality of components. The method includes receiving, via a user interface of a browser application, a user command for modifying model data corresponding to a 3D model, modifying the model data in accordance with the user command, including modifying respective portions of the model data to change one or more of dimensionality, positioning, and color of at least one of the plurality of components, automatically generating a description of the modification of the model data, and automatically causing the description of the modification of the model data to be transmitted via the browser application in an electronic message to another device operating on the communication network, including not receiving a user command to transmit the description of the modification from the user interface, so that the 3D model is synchronized between the computing device and at least one other device at which the 3D model is being concurrently developed.

DETAILED DESCRIPTION

Figure 1:
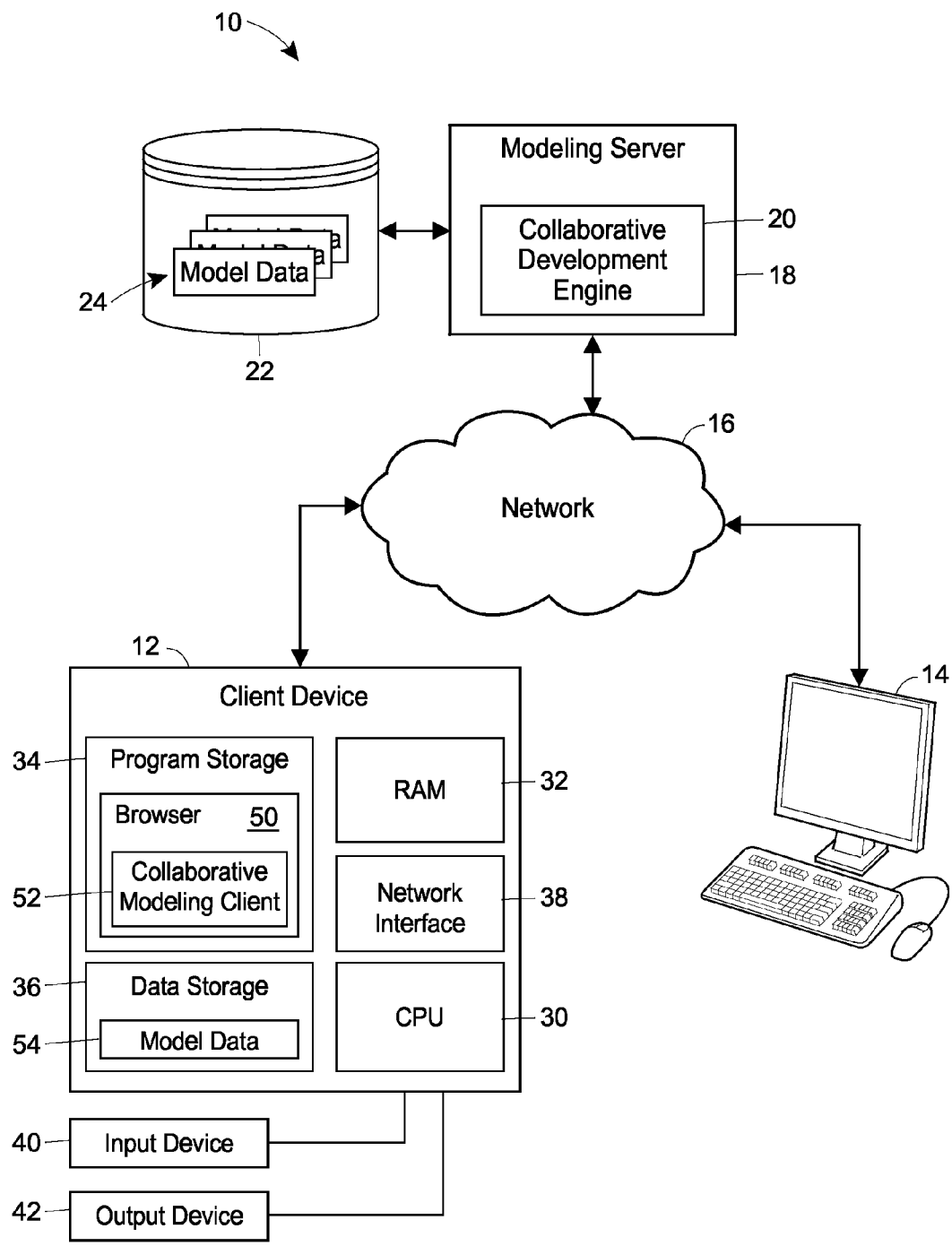
FIG. 1 is a block diagram of a communication system in which techniques of the present disclosure are utilized to allow a user operating a browser-based 3D modeling software module to develop a three-dimensional (3D) model of an object or a group of objects in collaboration with at least one other user.

In embodiments described below, a 3D modeling software module operating in a web browser application on a client device allows a user to develop models of various objects within a window controlled by the browser application in real-time collaboration with one or more users operating respective client devices. The user can access modeling functionality without launching a separate application and, in some implementations, without installing compiled software components on the client device. The 3D modeling software module (or simply "the modeling software") generally allows the user to create and edit 3D models of buildings, vehicles, items of furniture, and other objects using various controls, provided via the browser application, for manipulating component 3D shapes and/or 2D faces, defining interactions between the components, grouping the components into composite components, etc. The modeling software also allows the user to rotate a 3D model displayed in a browser application window, change the angle and the distance of the viewpoint relative to the model, and otherwise control the manner in which the model is rendered on a user interface of the client device. During a collaborative development session, the modeling software receives user commands via the browser application for modifying the 3D model, generates a representation of the desired modifications (also referred to below as "mutations" of the model), and causes the modifications to the 3D model to be synchronized with one or more client devices. The 3D model may be stored in a memory as model data that specifies multiple simple (e.g., cuboids, spheres) and aggregate components having groups of simple components, and modifications to the 3D model may include modifications of dimensionality, positioning, color or texture, and other properties of some or all of the components described by the model data.

More specifically, to operate as a part of a web browser application, the 3D modeling software module includes components to display a user interface via a window controlled by the browser application or otherwise via the browser application, the networking functions of the client device on which the browser application executes, the graphics functions provided by the browser application or an extension/plugin of the browser application. To support real-time collaborative development, the modeling software includes a collaboration module that may be implemented as a compiled software module, a script interpreted at runtime, a combination of compiled and scripted instructions, etc. The collaboration module may report the modifications to, and receive indications of modifications at other client devices from a modeling server that operates in a communication network. Depending on the implementation, the modeling server performs at least some of the following functions to facilitate collaborative development of a 3D model: keeping track of participating client devices, creating and managing a master copy of the 3D model that reflects various reported modifications at multiple client devices, resolving conflicts between concurrent operations by several users (or propagating the modifications to client devices for local conflict resolution), etc.

Browser-Based Collaborative Development of 3D Models

Referring to FIG. 1, techniques for browser-based collaborative modeling can be implemented in a communication system 10, for example. In an embodiment, the communication system 10 includes a client device 12, another client device 14 that operates independently of the client device 12, and a communication network 16 to which the client devices 12 and 14 are communicatively coupled. Although the client devices 12 and 14 include similar hardware, software, and/or firmware components, the components of only the client device 12 are shown in FIG. 1 for ease of illustration. In operation, a user operating the client device 12 develops a model of an object or a group of objects in collaboration with another user operating the client device 14. The communication system 10 may also include a modeling server 18 in which a collaboration engine 20 facilitates interactions between the client devices 12 and 14 during the collaborative development process. Because the modeling server 18 supports collaborative functionality, the modeling server 18 also may be referred to as a "collaboration server." The modeling server 18 may be coupled to the client devices 12 and 14 via the communication network 16. Further, in an embodiment, the communication system 10 includes a model database 22 to store model data 24 corresponding to various 3D models.

The client device 12 includes a central processing unit (CPU) 30 having one or more processors to execute computer-readable instructions, a random access memory (RAM) unit 32 to store data and instructions during operation, program storage 34 including persistent memory to store software applications, shared software components such as Dynamic-link Libraries (DLLs), and other programs executed by the CPU 30, data storage 36 including persistent memory to store data used by the programs stored in the program storage 34, and a network interface 38 to support wired and/or wireless communications with the modeling server 18, the client device 14, and other devices operating on the network 16. By way of example, the program storage 34 and the data storage 36 may be implemented on a hard disk drive (HDD) coupled to the CPU 30 via a bus. Generally speaking, each of the components 30, 32, 34, 36, and 38 may be implemented in any suitable manner as a single module, multiple modules, or a component of another module. Further, the memory components such as the RAM 32, the program storage 34, and the data storage 36 may include any suitable type of tangible, non-transitory computer-readable medium.

In the example implementation of FIG. 1, the client device 12 is a personal computer (PC). However, in general, the client device 12 may be any suitable stationary or portable computing device such as a tablet PC, a smartphone, etc. Although the computing device 12 in the example of FIG. 1 includes both storage and processing components, the client device 12 in other embodiments can be a so-called thin client that depends on another computing device for certain computing and/or storage functions. For example, in one such embodiment, the data storage 36 and the program storage 34 are external to the computing device 12 and are connected to the client device 12 via a network link. Further, the client device 12 may be coupled to an input device 40 and an output device 42. The input device 40 may include, for example, a pointing device such as a mouse, a keyboard, a touch screen, a trackball device, a digitizing tablet, or a microphone, and the output device 42 may include an LCD display device, a touch screen, or another suitable output device. Using the input device 40 and the output device 42, a user can access a graphical user interface (GUI) of the client device 12.

With continued reference to FIG. 1, the program storage 34 may store a browser application 50 for retrieving content from hosts operating on the network 16, interpreting and rendering the content and, in some cases, supporting various user interactions with the retrieved content. Several examples related to browser functionality are discussed in more detail below with reference to FIGS. 2A-D. The program storage 34 also may store a 3D modeling software module, such as a collaborative 3D modeling client 52 that executes in the browser application 50 to develop 3D models of various objects independently at the client device 12 or in collaboration with one or more client devices. In other embodiments, however, the modeling client 52 is only stored in the RAM 32 during runtime and is not stored in persistent memory at all. For example, the modeling client 52 may be downloaded from the modeling server 18 each time a user develops a 3D model at the client device 12. To this end, the modeling server 18 may include tangible, non-transitory computer-readable medium on which the instructions of the modeling client 52 are stored.

As explained below, the modeling client 52 may include a set of compiled instructions executable directly on the CPU 30, a set of instructions stored on a computer-readable medium and interpretable by the browser application 50 at runtime to be executed on the CPU 30, or both. Generally speaking, the modeling client 52 provides a set of modeling controls to generate, position, and variously adjust three-dimensional objects, apply textures to the shapes or surfaces, define interactions between shapes, etc. The modeling client 52 further supports collaboration between the client device 12 and one or more other client devices, according to an embodiment. The modeling client 52 may include such functions as forwarding modifications to model data to the modeling server 18, receiving modifications from the modeling server 18, exchanging versions of a 3D model being developed at the client device 12 with the modeling server 18, the client device 14, or both, reporting and receiving modifications of a viewpoint, etc.

In order for the modifications to be transmitted to the modeling server 18 (or directly to the client device 14), the user of the client device 12 need not complete the editing session. In other words, the user need not indicate to the modeling client 52 that a new version of the 3D model is ready to be forwarded to another device by entering an explicit user command or by exiting the edit mode, exiting the modeling client 52, saving the model data, etc. Instead, the modeling client 52 may forward the modifications in real-time concurrently with the user making further modifications, inspecting the model, or continuing to otherwise interact with the 3D model via the browser application 50. Similarly, the modeling client 52 may receive real-time indications of modifications at other client devices during different stages of interacting with the 3D model at the client device 12.

Models developed using the modeling client 52 may be stored on a computer-readable medium, such as the data storage 36, as data files including model data 54 that conforms to a certain non-image format, e.g., a format that specifies various parameters and attributes of a model rather than a static snapshot of the model. For example, the non-image format may specify a set of faces of 3D models along with the corresponding attributes, such as the position and orientation of a face, the texture of the face, etc. The modeling client 52 may interpret the model data 54 to render the corresponding 3D model in an image format, such as a raster format. Further, the model data 54 may include a hierarchical tree data structure with branches on two or more levels describing respective components. An example tree data structure that may be used to store model data is discussed in more detail with reference to FIG. 6.

According to some scenarios, the 3D model corresponding to the model data 54 is collaboratively developed at the client devices 12 and 14. Each of the client devices 12 and 14 may maintain a respective copy of model data 52. In one such embodiment, the client devices 12 and 14 exchange real-time or periodic updates describing modifications to the model data 52 at the corresponding client device, so that the modeling client 52 executing on the client device can appropriately update the local copy of the model data 52. In other embodiments, the modeling server 18 additionally or alternatively updates the "master" copy 24 of the model data 52, stored in the model storage 22, according to the updates received from the client devices 12 and 14.

In some scenarios, the model data 54 or similar model data is received from a web page which a user visits using the browser application 50. For example, a web page that stores architectural models may include one or several 3D models in a non-image format recognized by the modeling client 52. The web page may include an indication (e.g., a tag) that the included model data is interpretable and/or editable by the modeling client 52. Although the model data 54 is illustrated as residing in the data storage 36, model data in other embodiments or scenarios may be stored only in the RAM 32 and, in some cases, only while the browser application 50 is active. Further, in some embodiments, the web page that includes model data interpretable and/or editable by the modeling client 52 includes a link to a host from which a copy of the modeling client 52 may be downloaded. In this manner, a user visiting a web site that offers interaction with a 3D model can easily retrieve the necessary software for at least inspecting the 3D model.

The browser application 50 also may provide a window within which the modeling client 52 may render 3D models, and via which the modeling client 52 may receive from the input device 40 (e.g., a mouse). For example, the browser application 50 may support HTML 5, and the modeling client 52 (or web content that includes a 3D model) may generate a Canvas element within which the modeling client 52 may generate 3D shapes using 2D graphics primitives provided by HTML 5. As another example, the browser application 50 may utilize WebGL 3D Canvas to display 3D models. Further, the browser application 50 may propagate certain events, such as selection of radio buttons, check boxes, menu items, etc. to the modeling client 52 for further processing.

Figure 2A:
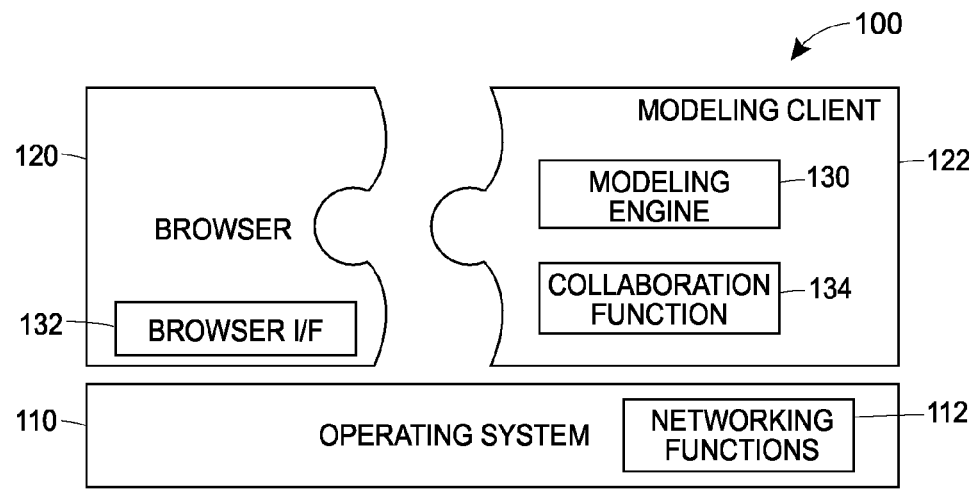
FIG. 2A is a high-level block diagram of an example computing environment implemented in a client device of FIG. 1, in which a 3D modeling software module and a collaboration function are provided in a browser plugin.
Figure 2B:
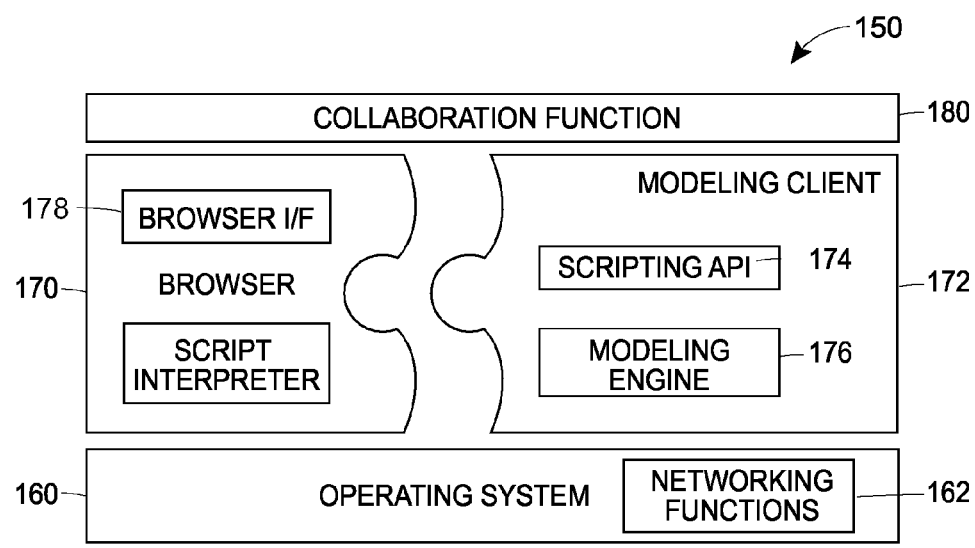
FIG. 2B is a high-level block diagram of another example computing environment that can be implemented in a client device of FIG. 1, in which a 3D modeling software module is provided in a browser plugin, and a collaboration function is provided in a script interpretable by a browser.
Figure 2C:
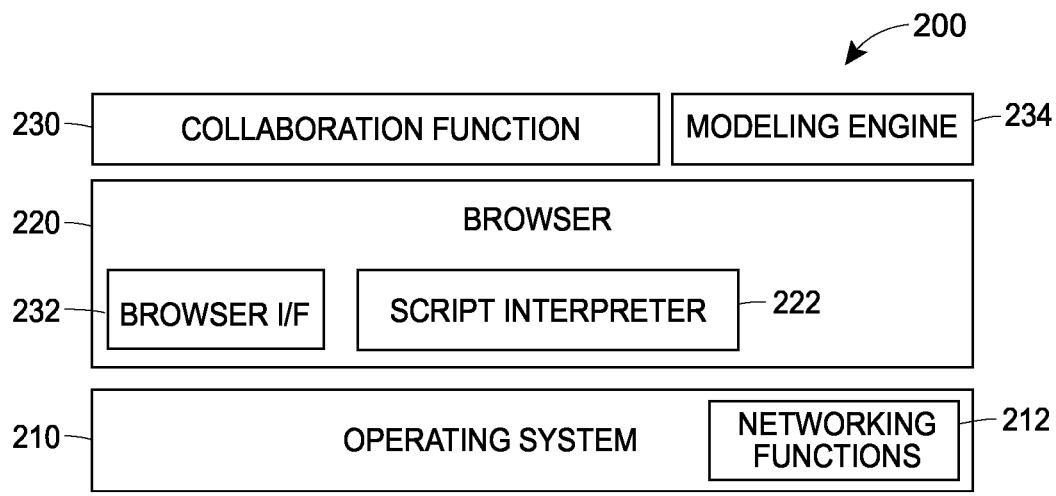
FIG. 2C is a high-level block diagram of another example computing environment that can be implemented in a client device of FIG. 1, in which a 3D modeling software module and a collaboration function are provided in a script interpretable by a browser.

Next, FIGS. 2A-C illustrate several examples of a computing environment in which a 3D modeling software module may operate as a modeling client in a browser application. The client device 12 or 14 of FIG. 1, for example, may implement the computing environment of any of FIGS. 2A-C or a suitable combination of these environments. Further, in an embodiment, the client device 12 implements the computing environment illustrated in one of FIGS. 2A-C, and the client device 14 implements the computing environment illustrated in a different one of FIGS. 2A-C.

Referring first to FIG. 2A, a computing environment 100 may include an operating system 110, which may be any suitable operating system such as Android, Windows, Linux, Mac OS, iOS, Android, etc. In general, the operating system 110 may include functions and support drivers for scheduling and executing tasks, obtaining memory resources, accessing the file system as well as input devices, output devices, display devices, and other peripheral devices, exchanging messages between tasks, etc. The operating system 110 may include networking functions 112 to support wired and/or wireless communications with other network devices. For example, the networking functions 112 may include device drivers to support network cards or other network interface modules, such as the network interface 38 illustrated in FIG. 1, for example.

In the computing environment 100, a browser application 120 executes on the operating 110 to provide browser functionality, which may include core browser functionality, user interface features and, optionally, one or several additional features such as playback of certain multimedia content, for example. Generally speaking, core browser functionality may include messaging according to such communication protocols as Internet Protocol (IP), Transmission Control Protocol (TCP), User Datagram Protocol (UDP), Secure Socket Layer (SSL), and Hypertext Transfer Protocol (HTTP), parsing of content provided in a mark-up language (e.g., Hypertext Markup Language or HTML) and scripts provided in a scripting language (e.g., JavaScript), authentication, management of digital certificates for SSL communications, caching web content and managing the cache, etc. In other embodiments, however, at least some of the messaging functionality may be provided by the operating system 110 (e.g., by the networking functions 112). Further, depending on the implementation, the core browser functionality may include rendering images provided in a standard image format such as BMP, JPEG, or GIF, for example, as well as playing back audio files or feeds and displaying video content provided in respective audio and video formats. The user interface of the browser application 120 may allow a user to specify target hosts and resources, view the rendered content, select links, control interactive content, etc. In at least some embodiments, the browser application 120 utilizes user interface functions provided by the operating system 110 for generating viewing windows, displaying user controls, processing events related to the displayed user controls, etc.

In an embodiment, a modeling client 122 is provided as a plugin that extends the functionality of the browser 120. In particular, the modeling client 122 may include compiled code with functions invokable by the browser 120. The modeling client 122 can be installed in the computing environment 100 only after a user of the corresponding device agrees to the terms of use of the modeling client 122, according to an embodiment. Referring back to FIG. 1, the modeling client 122 may correspond to the modeling client 52, and may be provided by the modeling server 18 in response to a request from the client device 12.

As illustrated in FIG. 2A, the modeling client 122 may include a modeling engine 130, a browser interface module 132, and a collaboration function module 134. The browser interface module 132 in general facilitates various interactions between the browser 120 and the modeling client 122 to provide a user interface for the modeling client 122. According to an embodiment, the browser interface module 132 receives events and data from, and provides content to, the browser module 120. For example, the browser interface module 132 may receive keyboard events, mouse click events, touchscreen gesture events, voice commands, packets received from network devices via the network functions 112, relevant events of the OS 110, etc. On the other hand, the browser interface module 132 may provide data such as a raster image of a 3D model to the browser module 120, route events originating in the modeling client 122 to the browser 120, provide collaboration messages generated by the collaboration function module 134 to the browser 120 for transmission to a modeling server or a peer client device, etc. The browser interface module 132 in one example implementation includes instructions in HTML 5, JavaScript, and Cascading Style Sheets (CSS).

With continued reference to FIG. 2A, the modeling engine 130 interprets model data to generate a raster image of the corresponding 3D model, creates new components in response to commands received via the browser interface module 132, modifies model data to add, remove, resize, retexture, and otherwise update selected components, and provides other functionality for developing 3D models. Using the user interface of the browser application 120 to interact with the modeling engine, a user can generate and position 3D shapes (and, in some cases, 2D shapes), apply colors and/or textures to various shapes, move, scale, rotate, and skew the shapes, groups shapes to define aggregate model components, etc.

The collaboration function module 134 may provide functionality for real-time collaborative development. In particular, when a 3D model is being collaboratively developed at a client device that implements the computing environment 100 and one or more other devices, the collaboration function module 134 may support some or all of the following functions: inviting and accepting collaborators, generating descriptions of updates to a 3D model applied in the computing environment 100, generating requests to lock or unlock components of the 3D model, receiving and processing updates to the 3D model applies at another device, receiving and processing indications that certain components have been locked for exclusive editing at another device, etc. Example techniques that may be implemented in the collaboration function module 134 are discussed in more detail below.

Each of the components 130-134 may be provided as a respective set of compiled instructions within the modeling client 122. In another embodiment, the modeling client 122 initially may be provided with the modeling engine 130 and browser interface module 132, and the collaboration function 134 may be provided in the form of additional compiled instructions in response to a separate request from the client device.

Now referring to FIG. 2B, a computing environment 150 includes an operating system 160 with networking functions 162 that are generally similar to the operating system 110 and the networking functions 112, respectively. Further, similar to the browser 120, a browser 170 operating on the operating system 160 may support core browsing functionality and user interface features. A modeling client 172 may be provided as a plugin that includes a scripting Application Programming Interface (API) 174, a modeling engine 176, and a browser interface module 178. Further, a collaboration function 180 may provide functionality similar to that of the collaboration function module 134, except that the collaboration function 180 is a script interpreted by the browser application 170 at runtime (rather than a set of compiled instructions, for example).

More specifically, in an embodiment, the scripting API 174 provides an interface via which certain functionality and data structures of the modeling client 172 are made accessible to other programs, so that the functionality of the modeling client 172 can be extended to include additional features. The interface provided by the scripting API 174 may be consistent with a scripting language supported by the browser application 170, and the browser application 170 may include a script interpreter to interpret, at runtime, and execute instructions in the scripting language to which the collaboration function 180 also conforms. For example, in an embodiment, the browser application 170 and the scripting API 174 support Javascript instructions, and the collaboration function 180 includes Javascript instructions executable by the browser application 170.

Further, to give users more flexibility, the collaboration function 180 may allow users to select various mechanisms for resolving or preventing conflicts between concurrent edits. Users may select the desired mechanisms programmatically, for example, via additional scripts compatible with the script-based collaboration function 180. In an embodiment, the collaboration function 180 includes a locking function to lock the model or a component of the model so as to reserve the model or the component for editing. In response to a user activating the locking function, the collaboration function 180 may generate a locking notification to notify one or more client devices that the component has been locked. Alternatively or additionally, the collaboration function 180 may include a function for generating a description of the modifications applied to the component that is compatible with an operational transformation (OT). Generally speaking, OT techniques allow client devices to modify the same component in parallel and in real time without locking the component. Because the component may be in different states at different devices, modifications of a component at a client device are described in terms of operations that are then transformed, as necessary, at another client device to ensure that the operations are applied to the component consistently. In an implementation, to generate an OT-compatible representation of a modified component, the collaboration function 180 also generates a serialized representation of the component, i.e., an ordered listing of the elements included in the component that allows the API to precisely indicate to which of the elements in the component a transformation has been applied. These and other techniques for notifying other client devices of changes to the model or portions of the model are discussed in more detail below.

As another example, FIG. 2C illustrates a computing environment 200 that includes an operating system 210 with networking functions 212, a browser 220 including a script interpreter 222, and several 3D modeling components provided as respective scripts interpretable by the script interpreter 222 at runtime. In particular, the computing environment 200 includes a browser interface 232, a collaboration function 230, and a modeling engine 234 (generally similar to the components 132, 134, and 130, respectively), each provided in a scripting language. In an embodiment, the components 230-234 are provided separately, so that the user need not download the collaboration function 230 unless he or she wishes to participate in collaborative 3D modeling.

Figure 2D:
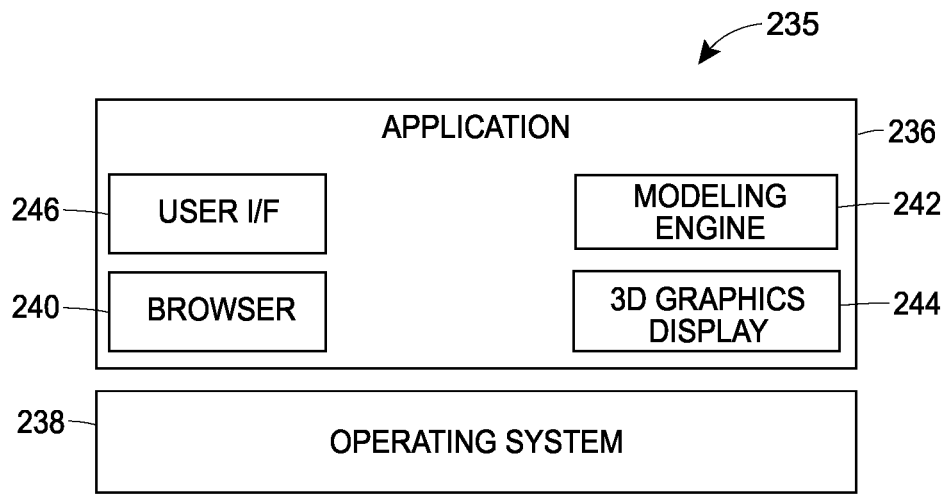
FIG. 2D is a high-level block diagram of another example computing environment that can be implemented in a client device of FIG. 1, in which a browser component is implemented in a client application.

As yet another example, FIG. 2D illustrates a computing environment 235 that includes an application 236 that executes on an operating system 238 and includes an embedded browser viewer 240, a modeling engine 242, a 3D graphics display module 244, and a user interface component 246. In this implementation, the application 235 provides a framework (e.g., event handling, resource allocation) and incorporates modeling as well as graphics rendering functionality via the components 242 and 244, each of which can be provided as a corresponding function library or a plugin, for example.

Figure 3:
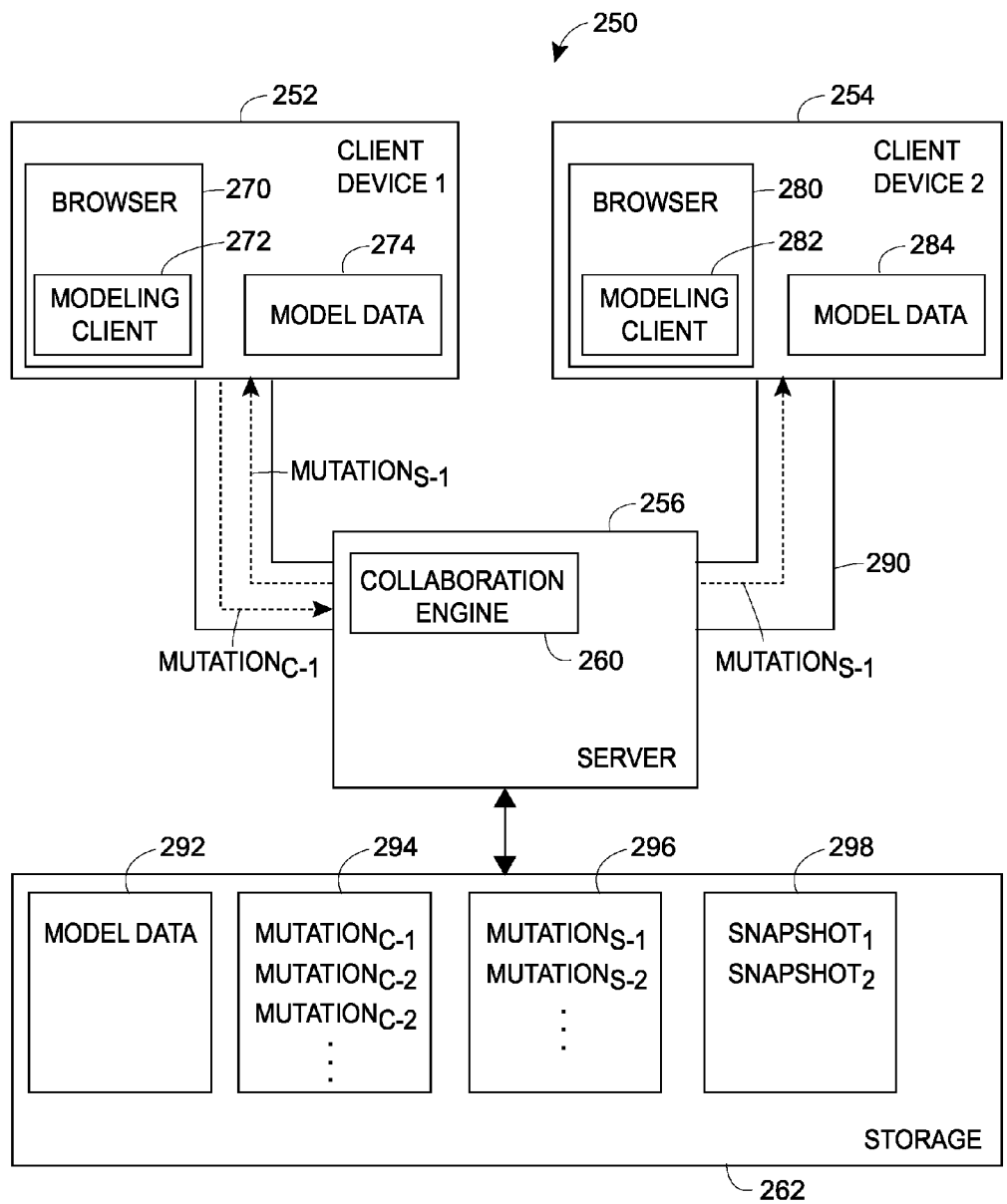
FIG. 3 is a block diagram of a communication system in which a server coordinates updates to a 3D model between two client devices during a collaborative development session.

As indicated above, client devices via which users collaboratively develop 3D models may rely on a modeling (or collaboration) server to resolve conflicts between concurrent edits, maintain master copies of 3D models being concurrently developed, version 3D models, etc. To illustrate an example mechanism for interaction between devices in a collaborative modeling environment, a communication system 250 including modeling clients 252 and 254 as well as a modeling server 256 is illustrated in FIG. 3. During a typical collaborative development session, a collaboration engine 260 operating in the modeling server 260 coordinates updates to a 3D model between the client devices 252 and 254. In an embodiment, the modeling server 18 and the collaborative development engine 20 of FIG. 1 are implemented as the modeling server 256 and the collaboration engine 260, respectively. The modeling server 260 also may be coupled to a storage 262 which may be a database implemented on one or several servers, for example.

In the communication system 250, each of the client devices 252 and 254 includes a browser application (270, 280), a modeling client with collaborative functionality operating in the browser application (272, 282), and a copy of the model data (274, 284). The computing environment of the client devices 252 and 254 may be implemented according to one of the examples illustrated in FIGS. 2A-C, a combination thereof, or in another suitable manner.

To receive real-time updates related to collaborative model development, the client devices 252 and 254 may set up persistent communication channels 290. For example, the browser application 270 may maintain an open UDP or TCP port P specifically for incoming messages used by the modeling client 272 or 282 to define a communication (or "browser") channel. For outgoing messages, the browser application 270 may use the same port P or another port, such as the port typically used for HTTP traffic (e.g., 80).

After a user makes one or several modifications of the model data 274 at the client device 252, the modeling client 272 may generate a description of these modifications, which also may be referred to as a "mutation," and provide the description to the collaboration engine 260 as $Mutation_{C-1}$. Example content of such descriptions of modifications, as well as several principles according to which these descriptions may be generated, are discussed in more detail below. The collaboration engine 260 may update a copy of the model data 292 in accordance with $Mutation_{C-1}$, when possible, and add $Mutation_{C-1}$ onto an event queue 294. In some cases, the collaboration engine 260 does not modify the model data 292 in exact conformance with $Mutation_{C-1}$. For example, $Mutation_{C-1}$ may conflict with an earlier modification at another client device, in which case the collaboration engine 260 modifies the model 282 in view of $Mutation_{C-1}$ and the earlier modification or, in some cases, does not apply the modification specified by $Mutation_{C-1}$ at all. In either case, the collaboration engine 260 may generate a description of a modification applied at the server 256 as $Mutation_{S-1}$, add the $Mutation_{S-1}$ to a server modification queue 296, and broadcast the $Mutation_{S-1}$ to all client devices participating in the development of the 3D model described by the model data 292 (in this case, the client devices 252 and 254). In various situations, $Mutation_{S-1}$ may be the same as $Mutation_{C-1}$, a description of a modification different from the one specified by $Mutation_{C-1}$, or an indication that no modification was applied at the server 256 in response to receiving $Mutation_{C-1}$.

Further, the server 256 may generate a unique version indicator for each modification applied by the collaboration engine 260: $Mutation_{S-1}$, $Mutation_{S-2}$, etc. Still further, the server 256 may generate a "snapshot" or copy of the 3D model corresponding to each version and store the snapshot in a queue 298. In this manner, the model data 292 corresponds to the latest version of the 3D model, as developed by the participating client devices 252 and 254, and the queue 298 stores previous versions of the 3D model associated with respective version identifiers.

Figure 4:
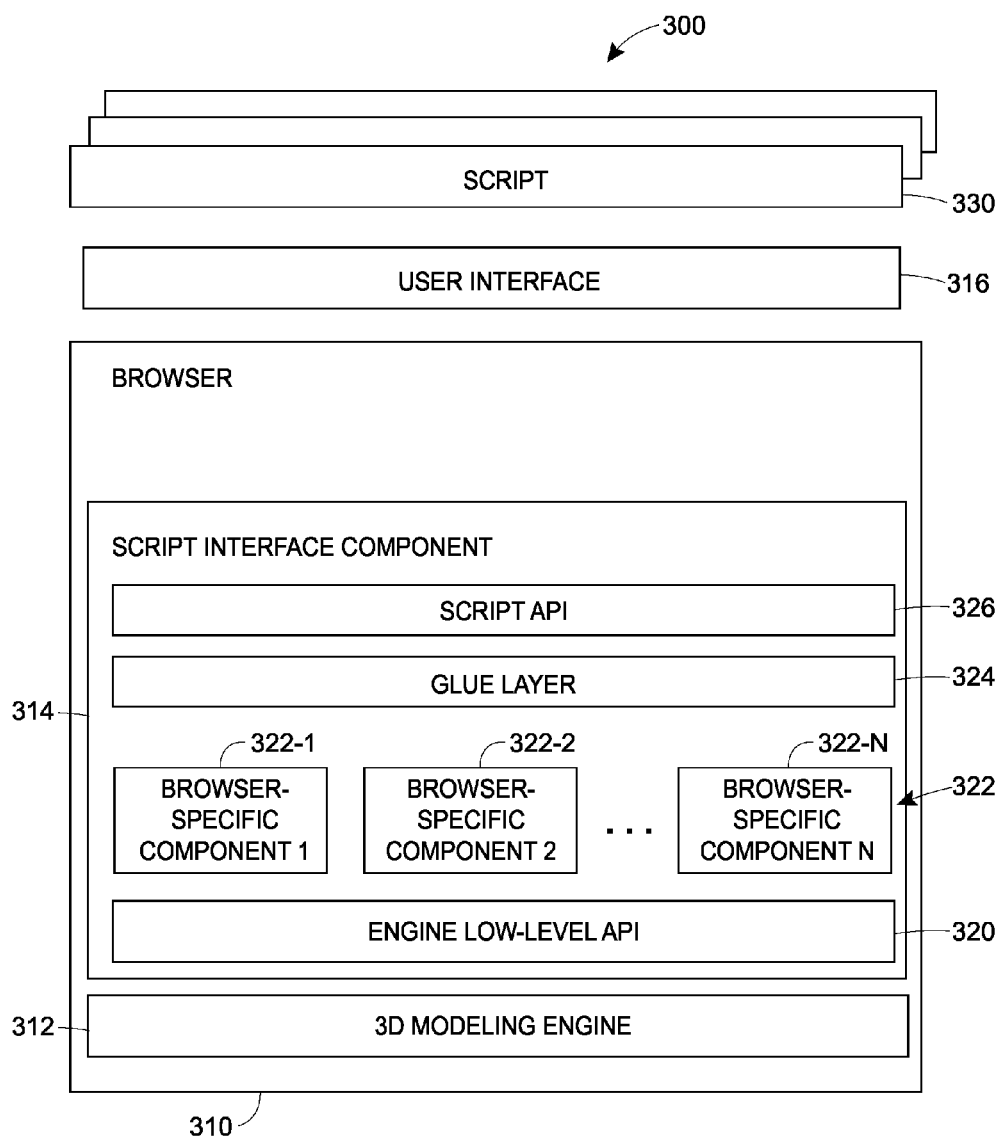
FIG. 4 is a block diagram of an example client-side 3D modeling sub-system including several components of a 3D modeling software module operating in a browser application.

Next, FIG. 4 illustrates an example client-side 3D modeling sub-system 300 that may be implemented in the client device 12 or 14 of FIG. 1, for example, or in one or both of the client devices 252 and 254 illustrated in FIG. 3. As another example, the modeling client device 172 and the browser 170 of FIG. 2B may be implemented similar to the 3D modeling sub-system 300.

The 3D modeling sub-system 300 includes a browser application 310 in which a 3D modeling engine 312 may operate as a plugin implemented, at least partially, as a set of compiled instructions. The 3D modeling engine 312 may be provided as a DLL, for example. Typically, the functions of the 3D modeling engine 312 can execute at the same speed as the browser application 310. Moreover, the 3D modeling engine 312 may be provided as a file stored in a predefined location which the browser application 310 always inspects upon launch to detect the presence of, and automatically load, files conforming to a certain format.

The 3D modeling engine 312 may be platform-specific and can be provided in different formats for different operating systems. In some embodiments, the 3D modeling engine 312 utilizes graphics functions provided as a part of the browser application 310 or externally to the browser application 310. For example, the 3D modeling engine 312 may use a cross-platform APIs for efficiently rendering graphics such as OpenGL®. More specifically, the 3D modeling engine 312 may interpret model data, which may include descriptions of various 3D and/or 2D shapes that make up the corresponding 3D model (stored in any suitable format including a proprietary format defined specifically for 3D model data), and invoke various functions of the OpenGL API for drawing lines, points, and other basic primitives to efficiently generate raster images. The OpenGL API in turn may utilize the available graphics hardware, such a GPU, transparently to the 3D modeling engine 312. As an even more specific example, the 3D modeling engine 312 may use OpenGL functions to generate a raster image corresponding to a certain perspective view of a 3D model. In response to receiving a user interface event from the browser application 310 indicating that the 3D model is to be rotated, the 3D modeling engine 312 may re-interpret the model data to determine which combination of geometric primitives describes the new perspective view of the 3D model, and invoke the corresponding OpenGL functions. In addition to interpreting model data, the 3D modeling engine 312 may provide functionality similar to that of the modeling engine 130, 176, or 234, for example (see FIGS. 2A-C).

The 3D modeling sub-system 300 also may include a script interface component 314 to facilitate the interaction of the 3D modeling engine 312 with the user interface layer 316 of the browser application 310 and provide a framework for efficiently adding extensions to the available 3D modeling functionality. More specifically, the script interface component 314 may include a low-level engine API 320, a browser-specific component 322, a glue layer 324, and a script API 326. In some implementations, the script interface component 314 is a plugin. The browser-specific component 322 may be, for example, an ActiveX® component 322-1 configured to wrap, or operate as a proxy for, the functions of the 3D modeling engine 312 so as to operate specifically in an ActiveX framework if the browser application 310 is a Microsoft Explorer browser or a compatible application. As another example, the browser-specific component 322 may be a Netscape Plugin Application Programming Interface (NPAPI) component 322-2. The script interface component 314 typically includes only one of the browser-specific components 322-1, 322-2, ... 322-N.

The low-level engine API 320 provides an interface between the 3D browser-specific components 322 and the 3D modeling engine 312, so that the same 3D modeling engine 312 can be used in multiple (or all) browser applications, which in some cases are provided by different manufacturers. For example, in an embodiment, the same 3D modeling engine 312 can be used in a Microsoft Explorer, Mozilla Firefox, or a Google Chrome browser application 310, and a respective one of the browser-specific components 322 makes the 3D modeling engine 312 compatible with the corresponding framework via the low-level engine API 320.

The glue layer 324 may be implemented in an Interface Description Language (IDL), for example, to bridge browser-specific components 322 with the script API 326, which provides access to at least some functions of the 3D modeling engine 312 (and, in some cases, other functions exposed by the browser application 310) via a scripting language interpretable by the browser application 310 at runtime. The script API 326 may be provided in Javascript, for example. Generally speaking, the script API 326 allows users to efficiently extend, customize, and configure the 3D modeling engine 312 via various scripts 330 and, in some cases, the user interface layer 316.

In an embodiment, 3D modeling engine 312 includes collaborative functionality. In another embodiment, however, the 3D modeling engine 312 does not include collaborative functionality, and the script API 326 is used to add collaborative functionality to the 3D modeling sub-system 300 via one of the scripts 330. For example, referring back to FIG. 2B, the scripting API 174 in the computing environment 150 may be similar to the script API 326, and the collaboration function 180 may be developed as discussed above so as to add collaborative functionality to the modeling engine 176. In yet another embodiment, the 3D modeling engine 312 provides several different mechanisms that can be used for collaborative modeling on a communication network, and the script API 326 is used by one of the scripts 330 to select and access the desired mechanism. An example of this approach is discussed in more detail below.

Referring again to FIG. 4, the user interface layer 316 may define user interface functions for 3D modeling in the browser application 310. More specifically, the user interface layer 316 may provide functions for manipulating objects (e.g., drag, drop, highlight) within a window which the browser application 310 allocates and controls for 3D modeling. Further, the user interface layer 316 may provide various interactive controls displayed within the window. These interactive controls may be, for example, icons on which a user may click to select stock objects, texture or color objects, rotate objects, scale objects, etc. The user interface layer 316 may be implemented using a suitable Software Development Kit (SDK) for developing front-end scripts, such as Asynchronous Javascript and XML (AJAX) instructions, that run on different types of browser application. In an embodiment, the user interface layer 316 is implemented using Google Web Toolkit (GWT).

Example Collaborative Development Techniques

Figure 5:
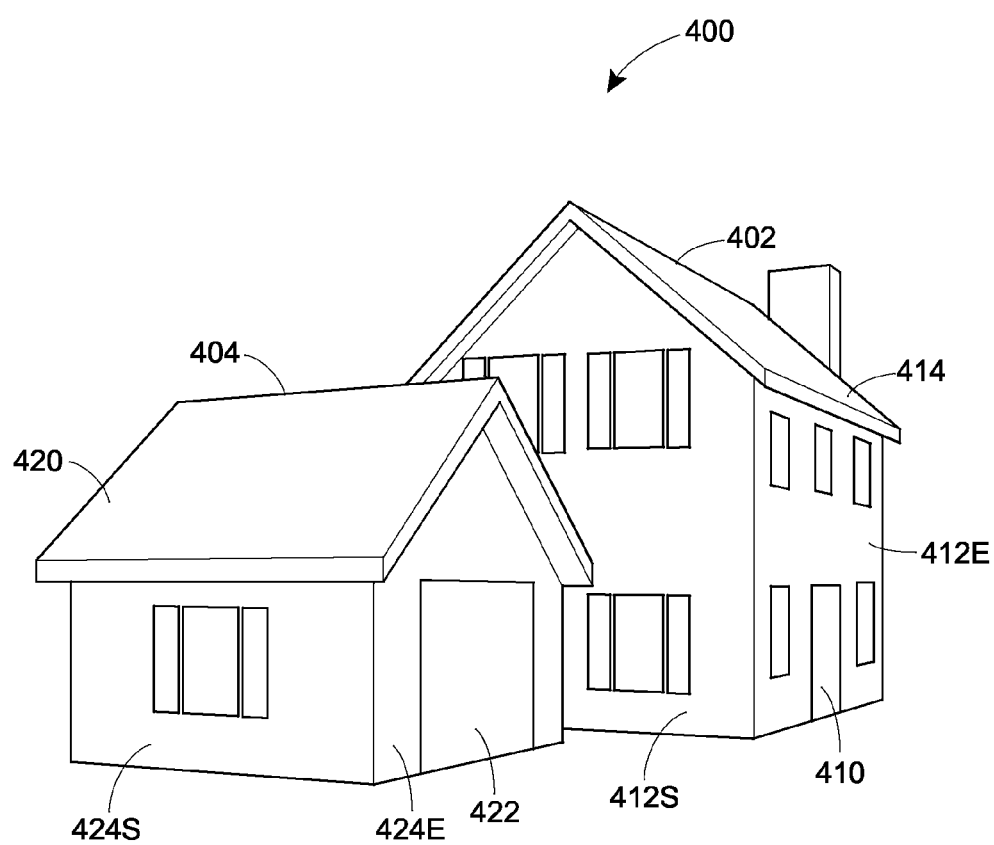
FIG. 5 illustrates an example model which users operating separate client devices of the communication system of FIG. 1 may collaboratively develop.
Figure 6:
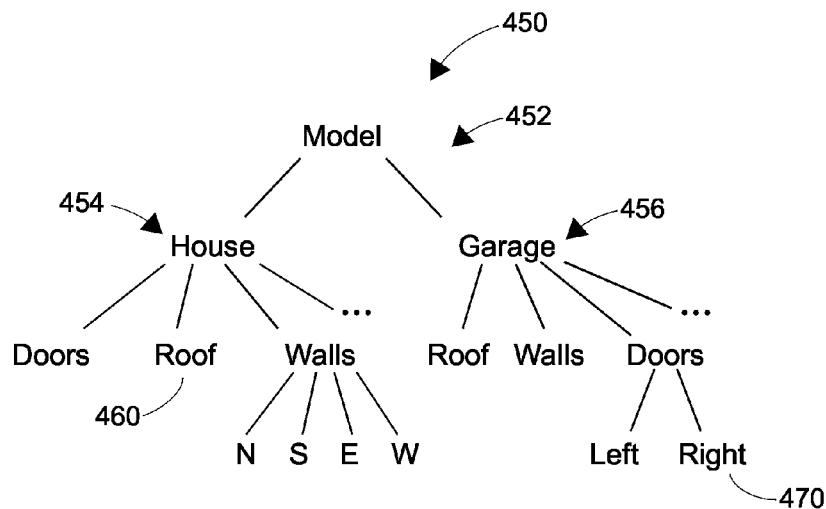
FIG. 6 is a diagram of an example data structure storing model data that describes the model of FIG. 5.
Figure 7:
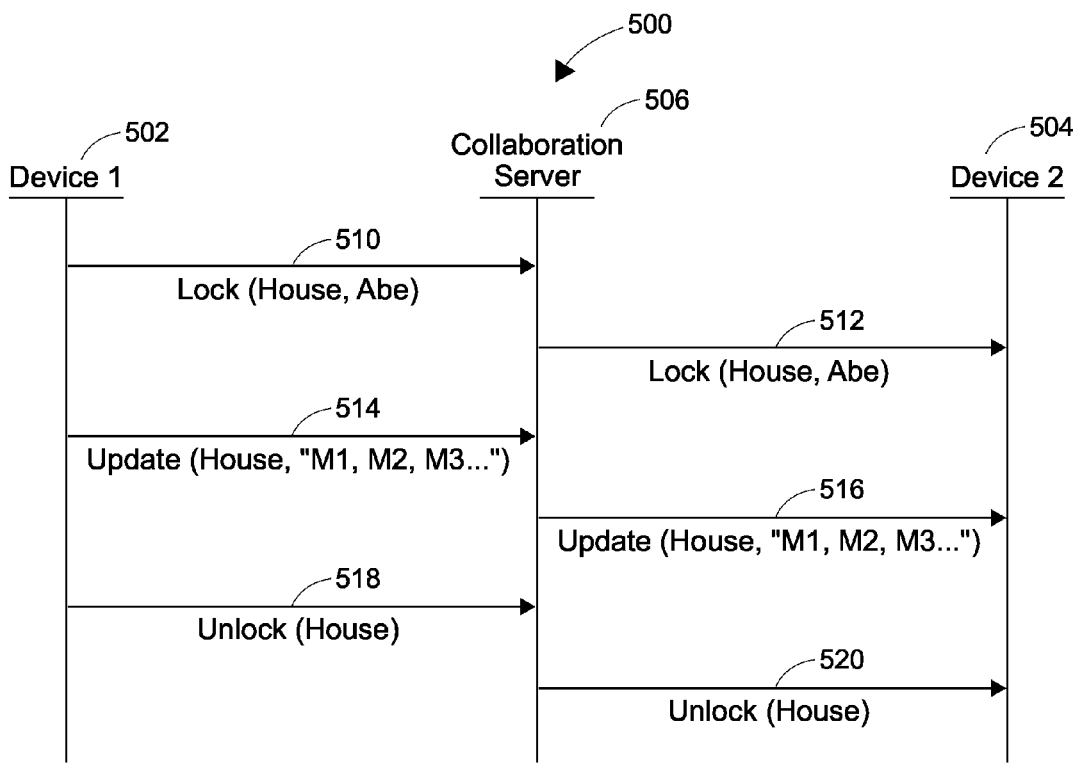
FIG. 7 is a messaging diagram that illustrates an example technique for collaborative 3D modeling at a pair of client devices communicatively coupled to a collaboration server.

To better illustrate example techniques which some of the devices discussed above may utilize to provide collaborative functionality, an example modeling scenario is considered next with reference to FIGS. 5-7. It is noted that although collaborative development techniques are discussed below in relation to 3D models, these or similar techniques also may be applied to 2D drawings and other types of data. For ease of explanation, the scenario is discussed with reference to the client devices 12, 14 and the modeling server 18 of FIG. 1. However, it will be understood that this scenario also may apply, in relevant part, to client devices that implement the computing environments of FIGS. 2A-C or the client-side 3D modeling subsystem 300 of FIG. 4, as well as to the devices operating in the communication system 250 illustrated in FIG. 3.

According to an example scenario, user Abe operating the client device 12 begins to develop a 3D model such a model 400 illustrated in FIG. 5. User Abe initially is a single developer of the model 400. As can be seen in FIG. 5, the model 400 includes a house component 402 and a garage component 404. Each of the components 402 and 404 in turn may include several sub-components. For example, the house component 402 includes a door 410, walls including a southern wall 412S and an eastern wall 412E visible in FIG. 5, and a roof 414, while the garage component 404 includes a roof 420, a door 422, and walls including a southern wall 424S and an eastern wall 424E visible in FIG. 5. As also can be seen in FIG. 5, the model 400 may include other components such as windows and a chimney, for example, the discussion of which is omitted for ease of illustration. According to one embodiment, each of the components illustrated in FIG. 5 is made up of one or more elements such as 3D geographic shapes: cuboids, spheres, pyramids, etc. In another embodiment, the components of FIG. 5 may be generated using groups of two-dimensional faces: squares, circles, triangles, etc.

The modeling client 52 may generate components of the model 400 according to commands received from user Abe. For example, to draw the roof 420, Abe may draw multiple shapes and group the shapes using the user interface of the modeling client 52 (e.g., by selecting several shapes with a mouse and activating an icon for generating a group of selected shapes). In general, a model can have nested components at multiple levels. For example, Abe may group several shapes to define a window frame component, then group the window frame component with several 3D shapes to define a window component, create several instances of the window component and group these several instances into a larger "multiple windows" component, etc. Further, in some embodiments, the modeling client 52 may allows users such as Abe to first define components as groups including multiple 3D shapes (and possibly other components) and then generate multiple instances of the defined component. When a user later edits an instance of a component, the changes are automatically applied to other instances of the component, according to an embodiment.

FIG. 6 is a schematic diagram of an example data structure 450 corresponding to the model 400, which the modeling client 52 may generate when user Abe groups the shapes in the manner outlined above. After Abe creates the model 400, the modeling client 52 initially may store model data 54 including the data structure 450 in the data storage 36. The data structure 450 includes a root node 452, a house branch 454, and a garage branch 456. Each of the branches 452 and 456 stores a particular component of the model 400. Further, the house branch 454 includes a roof branch 460 that corresponds to the roof component 414 as well as other branches corresponding to other components (a doors component, a walls component, etc.). As can be seen in FIG. 6, the garage branch 456 includes, among other branches, a doors branch with a right-door branch 470 that corresponds to the component 422. The right-door branch 470 may specify the component 422 as a set of 3D shapes, texture and/or color information, animation data, and other data. In general, a component may include drawing data, non-drawing data (text labels, metadata), and other components that also may include drawing and non-drawing data. In addition to the data structure 450, the model data 54 may include other information (e.g., metadata) such timestamp information, user information, etc.

In an embodiment, the modeling client 52 utilizes the data structure 450 to represent a selected component of the model 400 in a serialized format. Generally speaking, by generating a serialized representation a component branch, a device operating in a collaborative development environment permits another device, such as a client device or a modeling server, to properly resolve conflicts and address collisions between modifications submitted at several devices using OT techniques. A serialized representation of a branch may include a sequence of basic 3D shapes (cuboids, spheres, etc.) that make up the corresponding component, in an embodiment.

As an additional example, collaborative OT-based development of a text document may be briefly considered and contrasted with development of a 3D model. If two users collaboratively edit version V of a string of text S, such as "This is modeling," modifications to the string can be easily expressed in terms of text editing commands (e.g., insert, delete, replace, etc.) applied at specific character positions within the string S. For example, a first user may wish to insert the world "collaborative" following the eighth byte of the string S according to version V, and a second user may replace the word "is" in fifth and sixth bytes of the same version of the string S with the word "was." If the command from the second user is applied to the string S first, the unmodified command from the second user is then applied to the wrong portion of the string S. However, the commands from the first user and the second user can be easily reconciled by modifying the index at which the new word is to be inserted (in this case, the index can be modified to indicate the ninth byte rather than the eighth byte). In fact, in the example above, regardless of the order in which the two uses submit modifications to the string S, the conflict between the two commands is easily resolved, if the version V to which the corresponding command is applied is known. Thus, modifications to documents in which data is represented linearly (e.g., text documents) or in terms of numbered cells (e.g., spreadsheets) can be concurrently performed using indexing relative to a known version of the document. It is noted that this approach is compatible with lock-based as well as lock-free collaborative development.

On the other hand, unlike text or spreadsheet data, the model 400 is not easily described in a linear manner. The modeling client 52 may generate the data structure 450 to describe the model as a hierarchical tree structure and, when necessary, generate serialized descriptions of branches to report updates to other devices, for example. The collaborative development system of FIG. 1 may define a set of operations recognized at participating client devices, such that the operations may be described with reference to the serialized descriptions of component branches. For example, the set may include such operations at delete, move, and resize. Thus, an OT-based description of how a certain component branch has been modified at a client device may include an indication that a delete operation was performed on the first sub-component (such as a cuboid) and a resize operation was performed on the fourth component (such as a sphere) in the serialized listing of the component, to consider just one example.

With continued reference to FIG. 6, the modeling client 52 may generate a unique component identifier for a branch in the data structure 450, so that when multiple users collaboratively develop the model 400, they can unambiguously identify components within each other's copies of the data structure 450. In one embodiment, the modeling client 52 generates a component identifier for a component at the time when a user defines the component. For example, once Abe defines the garage component 404, the modeling client 52 may generate a component identifier as a string of alphanumeric characters and store the generated component identifier as an attribute of the branch 456. In another embodiment, the modeling client 52 generates a component identifier for a component in response to receiving an indication that a user wishes to edit the component during a collaborative development session. The component identifier in some embodiments is generated randomly. For example, the modeling client 52 may generate the component identifier that conforms to a Globally Unique Identifier (GUID) format and as such is associated with a low probability of duplication. In an embodiment, the modeling server 18 verifies whether the component identifier generated at the client device 12 is available. Further, the client device 12 may maintain a look-up table (e.g., a hash table) to quickly retrieve component identifiers for various components of the model 400.

Referring back to FIG. 1, Abe may then decide to invite another user, Bob, to edit or further develop the model in collaboration with Abe. To this end, Abe may activate a control provided by the collaboration modeling client 52 (e.g., a toolbar icon or a button labeled "invite") to generate an invitation to Bob in the form of an electronic message transmitted over the network 16, for example. The invitation includes Bob's email address, in an embodiment. The modeling client 52 may automatically prompt the user to supply a name for the model 400 and verify, using the modeling server 18, whether the supplied name is unique. User Abe, for example, may name the model 400 AbesModel. The modeling client 52 also may automatically group all previously ungrouped geometry (i.e., 3D geometric shapes) under the root node 452 into a single component so as to enable component-by-component locking during subsequent collaborative development. In some embodiments, the modeling client 52 then uploads the model data 54 to the model storage 22 automatically or in response to a corresponding command from Abe.

The modeling client 52 does not directly provide user-level controls for collaborative 3D modeling, according to an embodiment. Instead, the modeling client 52 may provide a library of functions which various programs, such as scripts interpreted at runtime by the browser application 50, may invoke according to the desired collaboration method. For example, as discussed above with reference to FIG. 2B and FIG. 4, modeling software may include a script API for extending the functionality of the corresponding 3D modeling engine. In an embodiment, the modeling client 52 exposes the library of collaboration functions via a collaboration API. Referring back to FIG. 2B, for example, the collaboration API may be provided as a component of the scripting API 174. As another example, the collaboration API may be a portion of the script API 326 illustrated in FIG. 4.

The library of functions may include, for example, an invite function to generate an invitation to a specified user or specified host, a group geometry function to group the 3D shapes under the root node, etc. In this manner, the functionality of the modeling client 52 can be extended to support collaboration in more than a single manner. For example, a script may utilize the collaboration API to provide a lock-based framework, a set of controls, and a mechanism to notify users of modifications performed at other client stations.

In an embodiment, the collaboration API provides a transform function which a script or a compiled program may invoke with a parameter list that include the identifier of an entity (e.g., a component, an element such as a 3D basic shape, etc.), an operation selected from a predefined list (e.g., translate, rotate, scale), and a user identifier. The collaboration API also provides a new_component function to add a definition and/or an instance of a component under the root node 452. The new_component function may be invoked with a definition of the new component, a user identifier, and a component identifier. Also, the collaboration API may include functions start_edit, edit, and end_edit, which the corresponding script invokes when a user begins to edit a component, edits the components, and completes editing the component, respectively. In an embodiment, invoking the function start_edit causes the collaboration API to automatically lock the component, and invoking the function end_edit causes the collaboration API to automatically unlock the component.

If desired, the collaboration API also may support non-edit, or "social" operations. For example, the collaboration API may provide a chat function to send a specified text string to a specified user. The collaboration API also may provide a fly function to allow a user who has changed his eye location (i.e., the perspective of the model) to notify other users of the change. Further, the collaboration API may provide a sync function to allow a user to request the latest version of model data from the modeling server 18. Still further, the API 52 may provide enter and exit functions to permit a user to enter and exit a collaborative development session, respectively.

In the scenario considered above, the collaboration API and/or the modeling client 52 may transmit the invitation to the modeling server 18 (and not directly to the client device 14). The modeling server 18 then may include a link to the model data 54 and forward the invitation to Bob's email address. For example, the invitation may be formatted as follows: http://modelshare/AbesModel.model, where .model is an extension used by the modeling client 52. Once Bob receives, and attempts to process, the invitation, the copy of the modeling application 52 executing on the client device 14 may verify that collaboration functions (e.g., the collaboration API) are provided on the client device 14. If the collaboration API is not yet installed on the client device 14, the modeling client 52 may automatically prompt Bob to download and install the collaboration API. To this end, the invitation (or the model data 54) may include a link to a location from which the collaboration API 52 may be retrieved. Once the collaboration API 52 is installed, a copy of the model 54 may be received directly from the client device 12 or from the model storage 22 for editing at the client device 14, so that the copy stored at the model storage 22 corresponds to a "master copy" which the modeling server 18 maintains according to the updates received from the client devices 12 and 14. However, in other embodiments, the modeling server 18 does not maintain a master copy, and each of the client devices 12 and 14 locally manages a local copy of the model data 62.

After Bob has accepted Abe's invitation, Bob may begin to work on the 3D model 400 using the client device 14 at the same time as Abe. For example, Abe may wish to modify the house component 402, while Bob may wish to edit the garage component 404. However, it is also possible that both Abe and Bob may decide to edit the same component of the model 400 at the same time. Further, Abe and Bob may wish to modify components corresponding to different branches of the data structure 450. For example, Bob may wish to add a tool shed as a new component of the model 400 while Abe continues to edit the house component 402. Bob's addition in this case may require that a new branch be added directly under the root node 452. Depending on the embodiment, Bob would need to lock the entire model 400 to add a new component, lock only the root component while allowing modifications to be applied to the house branch 454, or not apply a lock at all and instead rely on an OT technique or a similar methodology to apply changes to the model 400 in a lock-free manner. As briefly discussed above, the collaborative development system of FIG. 1 may provide one or several mechanisms for avoiding or resolving conflicts between modifications applied at different client devices.

FIG. 7 illustrates a diagram 500 of one example technique for modifying a selected component at a client device, operating in a collaborative modeling environment, using a lock. In the diagram 500, after one of devices 502 and 504 has accepted an invitation from the other one of the devices 502 and 504 to participate in collaborative development of a model, the device 502 communicates with the device 504 via a collaboration server 506 to negotiate the locking of a component, notify the other device of updates to the component, and later notify the other device that the component has been unlocked. In an embodiment, the technique of FIG. 7 is implemented in the communication network of FIG. 1 (for example, the client devices 12 and 14 may operate as devices 502 and 504, respectively, and the collaboration server 18 may operate as the collaboration server 506). However, it is noted that the technique illustrated in FIG. 4 also can be used in other suitable environments.

According to the example scenario introduced above, Abe may operate the device 502 and user Bob may operate the device 504. The device 502 may include 3D modeling software and a collaboration API similar to those discussed with reference to FIG. 1. Referring back to FIGS. 5 and 6, Abe may lock the branch 454 corresponding to the house component 402. The collaboration API (e.g., in response to a command from a script executing on the device 502) may generate a lock message 510 that identifies (i) the component 402 using, for example, a component identifier generated as discussed above, and (ii) Abe as the user requesting that the component 402 be locked for exclusive editing by Abe. The collaboration server 506 may verify that the component 402 has not yet been locked and forward the lock message 510 to the device 504 as a message 512. In an embodiment, the collaboration server 506 also updates the status of the component 402 in a table local to the collaboration server 506. In this manner, if another user attempts to lock the component 402, the collaboration server 506 may determine the status of the component 402 and reject the request to lock the component 402. Further, in some embodiments, the collaboration server 506 generates a lock confirmation message (not shown) and transmits the lock confirmation message to the device 502 in response to the lock message 510.

After the client device 502 has successfully locked the component 402, user Abe may modify the component 402. In particular, user Abe may apply a set of modification commands to the component 102 including, for example, commands to delete shapes, add shapes, reposition shapes, resize shapes, apply different colors or textures to elements, etc. Abe may then notify the collaboration server 506 of the modifications to the component 402 by activating a corresponding control on the user interface such as an update button, for example. The control causes an update message 514 to be generated including (i) an indication of the component to which modifications are applied and (ii) a description of the modifications and/or of the modified component, according to an embodiment. The update message 514 may include a version identifier to specify a version of the model (or the component) to which the modifications have been applied, in an embodiment. Similar to the examples discussed above, the 3D modeling software and/or the collaboration API executing on the client device 402 may provide functions and data structures to permit scripts to define user controls, generate and transmit messages, etc. In another embodiment, the collaboration API generates an update message automatically after a certain number of modifications applied to the currently locked component 402, periodically (e.g., once every two minutes), in response to detecting that Abe has finished her edits of the component 402, or according to another suitable scheme.

In still another embodiment, modifications of the model at the device 502 are reported to the device 504 in real time. For example, after a user moves the house component 502 via the user interface of the device 502, the modification is immediately reported as a move operation to the collaboration server 506 and thereafter forwarded to the client device 504. A user operating the device 504 may then see the modification on the user interface of the client device 504.

In an embodiment, the collaboration API of the device 502 generates a serialized representation of the branch that describes the component 402 to be included in the update message 514. For example, the collaboration API generates a linear listing of the elements and/or sub-components of the component 402, so that the one or several modifications of the component 402 applied at the device 502 can be specified relative to the specific elements included in the component 402. As a more specific example, referring back to FIG. 6, the elements under the house branch 454 (corresponding to the house component 402) may be sequentially listed as {Doors, Roof, N Wall, S Wall, E Wall, W Wall, . . . }. In this embodiment, the house branch 454 may be traversed in any suitable manner, but the traversal method at the device 502 should be recognized at the device 504 to avoid misalignment of elements.

In an embodiment, the serialized representation of the component branch 454 also may include an indication or description of modifications $M_1, M_2, \ldots M_N$ applied to the elements and components that make up the component branch 454. For example, the listing may include a description of the Roof component and an indication (a flag, a bitmask, etc.) that the Roof component has been modified at the device 502. In another embodiment, the update message 514 may identify only the modifications applied to the component 402 relative to a version of the component 402 available at the device 504 and/or the collaboration server 506. The description of modifications conforms to an OT format, according to some embodiments. Of course, the update message 514 in some cases may specify only one modification.

In another embodiment, the message 514 includes a description of a new version of the component and does not specifically indicate which elements within the component have been modified. Similar to the embodiment discussed above, the message 514 need not include a description of the entire model 400, and may include only the description of the modified component. However, according to this embodiment, another client device may simply replace an older version of the component with the new version. In general, the update message 514 may describe the house component 402 in any suitable manner.

With continued reference to FIG. 7, the collaboration server 506 may forward the update message 514 to the device 504 as a message 516. In an embodiment, the collaboration server 506 also modifies the master copy of the model according to the update message 514 and generates a new version identifier for the updated version. Referring back to FIG. 1, for example, the modeling server 18 may update the copy of the model data 24 in the model storage 22. For example, if the update message 514 indicates that the modifications $M_1, M_2, \ldots M_N$ were applied to version V of the model, the collaboration server 506 may update the master copy of the model, generate version identifier V+1, store the new version identifier V+1 along with the modified master copy of the model, and include the version identifier V+1 in the forwarded message 516. In other embodiments, the collaboration server 506 does not update a master copy of the model and merely forwards the modification information to the device 504.

For ease of illustration, only one instance of the update message 514 is shown in FIG. 7. However, client device in general may transmit any number of update messages prior to unlocking the component. When Abe completes modifications to the component 402, the collaboration API may generate an unlock message 518 in response to Abe activating the corresponding control on the user interface of the device 502 (which in turn may be provided by a script executing on the device 502), for example. As illustrated in FIG. 7, the unlock message 518 may identify the component 402. The collaboration server 506 may forward the unlock message 518 to the client device 504 as a message 520. In an embodiment, the collaboration server 506 also updates the status of the component 402 and/or of the model 400 in the model storage 22.

Figure 8:
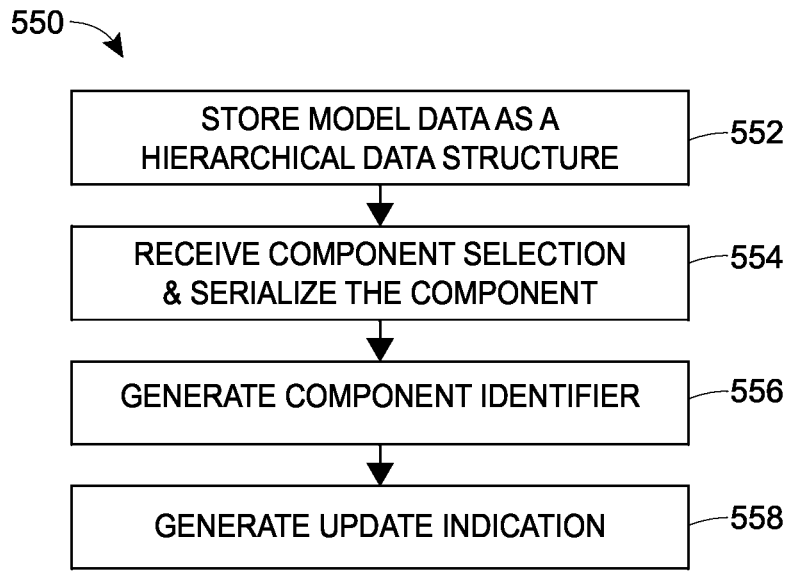
FIG. 8 is a flow diagram of an example method for generating an indication that a component of a model has been modified at a client device in a collaborative development environment.
Figure 9:
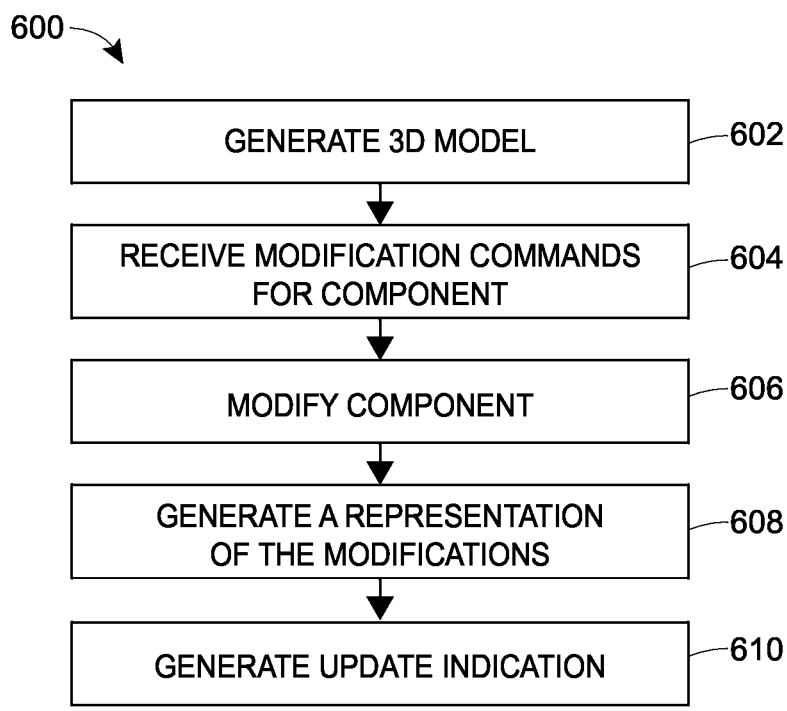
FIG. 9 is a flow diagram of another example method for generating an indication that a component of a model has been modified at a client device in a collaborative development environment.
Figure 11:
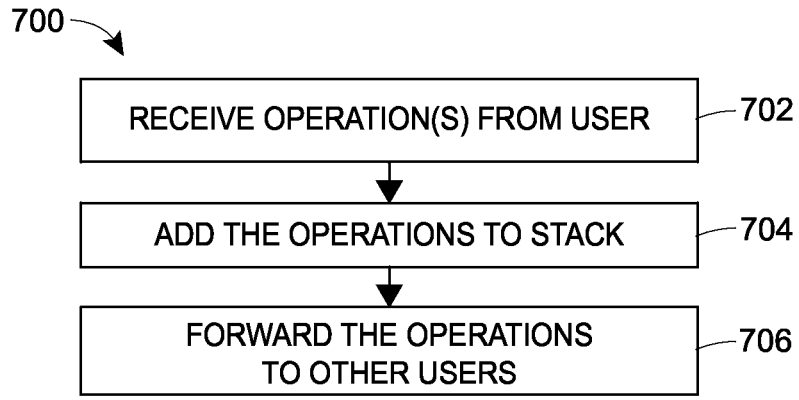
FIG. 11 is a flow diagram of an example method in a collaboration server for processing indications that a model has been updated at one or several client devices.
Figure 12:
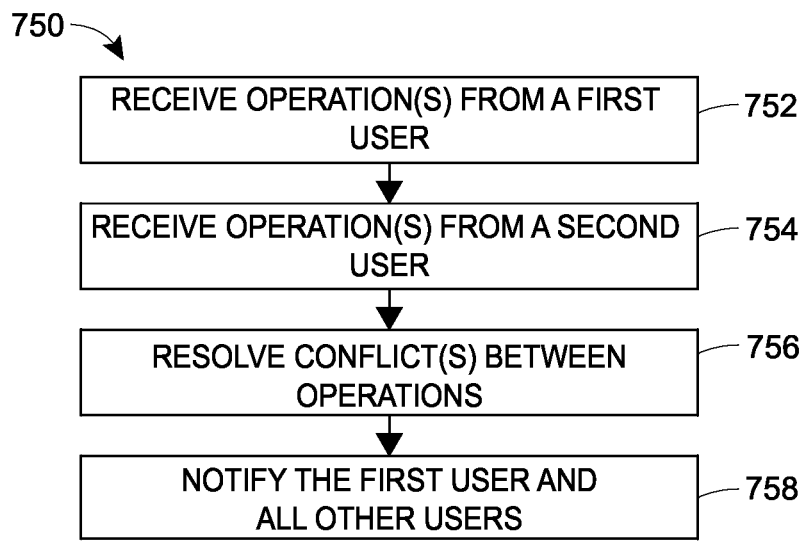
FIG. 12 is a flow diagram of another example method in a collaboration server for managing indications that a model has been updated at one or several client devices.

Next, several example methods that may be implemented in the communication system 10 or a similar environment to support collaborative development are discussed with reference to FIGS. 8-12. In particular, flow diagrams of several methods that can be implemented in a client device participating in collaborative 3D modeling on a network are illustrated in FIGS. 8-9, and flow diagrams of several methods that can be implemented in a collaboration server operating on a network are illustrated in FIGS. 11 and 12. In general, the methods of FIGS. 8-12 may be implemented using any suitable programming language and may be stored as instructions on a computer-readable medium. The instructions may execute on one or several processors, and may include compiled code, instructions interpreted by another software application (e.g., modeling software, a browser), or in any other suitable manner.

FIG. 8 is a flow diagram of an example method 550 for generating an update indication at a client device operating in a collaborative development environment. For example, the method 550 may be implemented in the client device 12 or 502 (in one embodiment, the method 550 is implemented in a collaboration API).

At block 552, model data corresponding to a 3D model is stored as a hierarchical data structure. For example, a tree data structure discussed with reference to FIG. 6 may be used. In general, the hierarchical data structure may include any desired number of levels and branches that may be specified by a user. Next, at block 554, a selection of a component of the model is received. In an embodiment, the user selects the component for editing by highlighting a visual representation of the component on a user interface, or by pointing to the visual representation of the component and activating a certain control (e.g., a button). In another embodiment, the user modifies a component, activates a control on the user interface, such as a button labeled update, and the modified component is automatically selected at block 554. In yet another embodiment, the component selection is received at block 554 in response to detecting that a user has modified the component via the user interface.

In some cases, several shapes in a model may be ungrouped at the time of selection. If the user selects one of the ungrouped shapes, these shapes may be automatically grouped into a component at block 554. Further, if the user selects several components corresponding to different branches of the data structure the lowest available parent branch that includes all of the selected branches is automatically selected. For example, if the user selects the wall 412S and the roof 514 of the model 400 depicted in FIG. 5, the entire house branch (branch 454 in FIG. 6) is selected.

Further, component data that includes a serialized representation of the selected component may be automatically generated at block 554. For example, the techniques discussed with reference to FIGS. 5-7 may be used. In an embodiment, the serialized representation of the component identifies modifications applied to particular elements within the component, so that OT techniques can be applied to resolve collisions between concurrent modifications at several client devices. In another embodiment, the serialized representation of the component describes the modified component without identifying particular changes to the component.

At block 556, a unique component identifier for the selected component may be generated as discussed above. Component data that includes the unique component identifier and, in an embodiment, the serialized representation of the component generated at block 554, is then provided in an update message generated at block 558. In an embodiment, the update message generated at block 558 is similar to the update message 514 of FIG. 7. In particular, in addition to the component identifier, the update message generated at block 558 may identify the user of the device in which the method 550 is being executed.

FIG. 9 is a flow diagram of another example method 600 for generating an update indication at a client device, where the user of the client device collaborates, in real time, with one or more users using respective client devices. Similar to the method 550, the method 600 may be implemented in the client device 12 or 502, for example. In an embodiment, the method 600 is implemented in a 3D modeling software such as the modeling client 52 and/or a collaboration API. Depending on the embodiment, blocks 602-610 of the method 600 are distributed between the modeling application and the collaboration API in any suitable manner.

At block 602, a 3D model is generated as discussed above in response to various user commands. The user may then decide to modify a component of the model and, at block 604, modifications commands may be received. The component may be modified in accordance with the received commands at block 606. Next, at block 608, component data including a representation of the modifications may be generated. The representation of the modifications may be compatible with OT techniques. To this end, the techniques discussed above with reference to FIGS. 1 and 5-7 may be used. At block 610, an update indication that includes the OT representation may be generated. The update indication generated at block 610 also may include other component data such a component identifier that uniquely identifies the component, for example.

Figure 10:
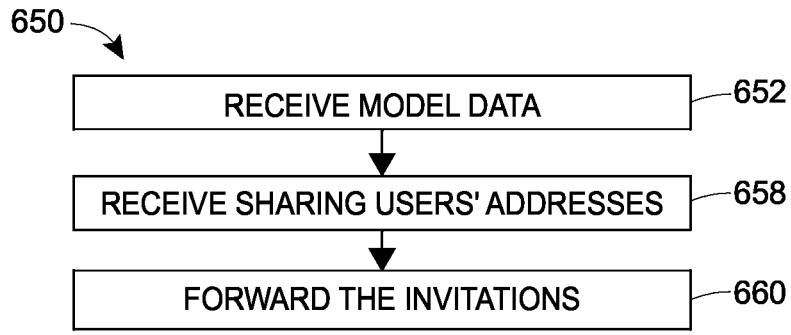
FIG. 10 is a flow diagram of an example method for processing an invitation for one or more users to join collaborative development of a model.

Next, FIG. 10 illustrates a flow diagram of an example method 650 for generating an invitation for one or more users to join collaborative development of a model. The method 650 is implemented in a collaboration API, according to an embodiment. At block 652, model data is received from a modeling application such as the modeling client 52, for example. At block 658, one or more email addresses (or other suitable identifiers) of users being invited to participate in collaborative modeling are received. For example, an appropriate dialogue box, via which a user may enter an email address, may be displayed on the user interface. The invitations are then generated and forwarded at block 660 to the invited users either via a collaboration server or directly, depending on the embodiment. The collaboration server also may generate a GUID for the model. Depending on the embodiment, an invitation forwarded at block 660 may include one or more of an identifier of the user who has generated the invitation, the model data received at block 652 or a link to a location where the model data is stored (e.g., the model storage 22 illustrated in FIG. 1) and a link to a location from which a collaboration API can be downloaded (e.g., a website maintained by the collaboration server.

Now referring to FIG. 11, an example method 700 for processing update indications from one or several client devices can be implemented in the modeling server 18, the collaboration server 506, or a similar device. At block 702, an indication of one or more operations applied to a model is received from a client device. The operations (e.g., delete, move, resize) correspond to certain modifications of the model. In an embodiment, the operations are reported along with an identifier of a version of the model to which the operations were applied, so that other devices may correctly apply these operations to the respective local copies of the model data in accordance with OT techniques, for example.

At block 704, the received operations may be added to an operation stack. The operations may also be assigned unique identifiers, such as sequential numbers, so that the relative order of the operations is preserved. Using the operation stack, the collaboration server and/or client devices may determine which operations have been performed at the client devices. For example, the stack may store operations $O_1$ and $O_2$ prior to receiving the new operations $O_3$ and $O_4$ at block 702. The stack accordingly may store operations $O_1$ through $O_4$ upon executing the method steps at block 704. Next, at block 706, the operations $O_3$ and $O_4$ may be provided to one or several participating client devices automatically or in response to a query from a client device, depending on the embodiment.

In another embodiment, a client device participating in collaborative development may at some point "check in" with the collaboration server and indicate the last operation performed at the client device is. For example, the client device may identify operation $O_1$ as the last operation performed at the client device. In response, operations $O_2$ through $O_4$ may be retrieved from the stack and provided to the client device, similar to the steps performed at block 406.

Thus, according to the technique of FIG. 11, operations reported by a client device are not necessarily applied to a centrally maintained copy of the model. Instead, in at least some of the embodiments, the operations are forwarded to participating client devices as appropriate, and the client devices apply these operations to respective local copies of model data.

FIG. 12 is a flow diagram of another example method 750 that can be implemented in the modeling server 18 or the collaboration server 506. According to the method 750, conflicts between concurrent modifications may be resolved at the server 18 or 506. In particular, at block 752, an indication of one or more operations applied to a model is received from a first client device, and an indication of one or more operations applied to the model is received from a second client device at block 752. The conflicts, if any, between the operations received at blocks 752 and 754 are resolved at block 756 using OT techniques or in any other suitable manner. Once the conflicts are resolved, the resulting operations are reported to the first user, the second user, and (when applicable) to all other participating users at block 758. Thus, if operations $O_1$ and $O_2$ are received from the first user and operations $O_3$ and $O_4$ are received from the second user, the result of executing the steps of the method 750 at block 756 may be that operation $O_3$ is skipped (e.g., rendered obsolete) and the operation $O_4$ is adjusted to correspond to the same type of an operation applied at a different place within a serialized representation of a component, for example.

By way of a more specific example, users Abe and Bob may be editing a model of a kitchen that includes a refrigerator. When Abe moves the refrigerator in her copy of the model, a corresponding operation is reported to the collaboration server (e.g., the modeling server 18), and the operation is stored in the stack and assigned a certain number (e.g., "6"). Bob may observe Abe's modification and, not liking it, delete the refrigerator. The deletion may be added to the stack as operation 7. Meanwhile, Chad may be on a slow connection. Unaware that the refrigerator has been deleted, Chad moves the refrigerator, and the operation is added to the stack as operation 8. In this scenario, at block 756, operation 7 is recognized to have rendered operation 6 moot and operation 8 obsolete (as referring to a component that no longer exists). When Chad checks in to retrieve operations for application to his copy of model data, only operation 7 is provided. In an embodiment, at block 756, a master copy of the model is also updated in accordance in view of the results of conflict resolution between operations.

Example Method for Browser-Based Collaborative Development of 3D Models

Figure 13:
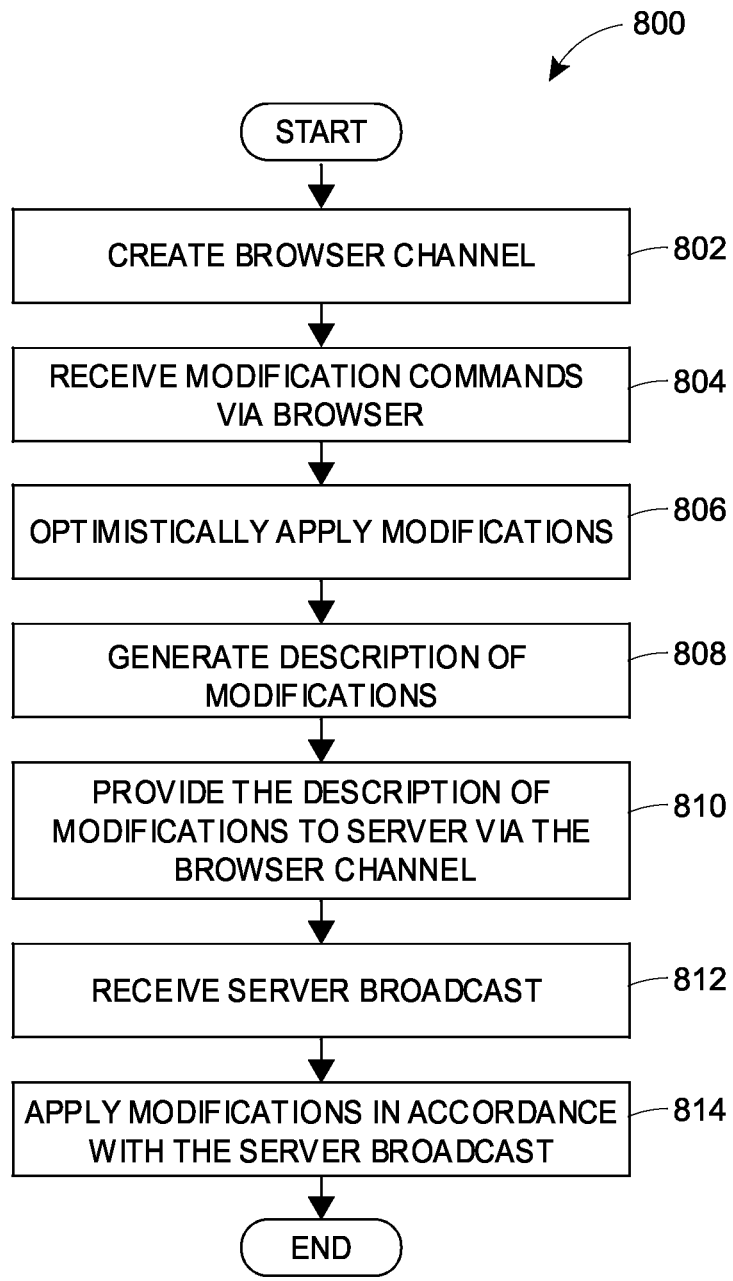
FIG. 13 is a flow diagram of an example method for browser-based collaborative development of a 3D model.

Generally speaking, the methods discussed with reference to FIGS. 8-12 can be utilized in collaborative development implemented in a browser application, a separate modeling application, or in any other manner. Next, FIG. 13 is a flow diagram of an example method 800 for collaboratively developing a 3D model in a browser application. For example, the method 800 may be implemented in the browser application 50 of FIG. 1, the browser application 270 or 280 of FIG. 3, the browser application 310 of FIG. 4, etc.

At block 802, a browser channel is created. For example, referring back to FIG. 3, the browser channel created at block 802 can be similar to the communication channel 290 set up between a client device and a collaboration server. Depending on the scenario, the method 800 may be invoked in response to a user inviting another user to participate in the development of a 3D model or in response to a user accepting an invitation from another user to participate in the development of a 3D model, for example. In another embodiment, a browser channel is automatically created when a user activates a browser window within a 3D model is displayed and collaborative functionality is made available for activation. In still other embodiments, one or more browser channels are created in response to other events, such as an explicit command from a user, a command from a collaboration server, etc.

At block 804, one or several modifications commands are received from a browser application in which a 3D software modeling may be implemented. A user may enter the modifications commands via the user interface of the browser application (such as the browser application 310 of FIG. 4), and the modification commands may be propagated to a 3D modeling engine (such as the modeling engine 312) via one or more intermediate components (e.g., the user interface layer 316, the low-level API 320). As discussed above, these modifications also may be referred to as "mutations" of a 3D model.

With continued reference to FIG. 13, the modifications may be optimistically applied at block 806. In other words, the modifications may be applied to generate an initial modified version of the model data with expectation that the modeling server will approve the modifications in their entirety. Next, at block 808, a description of the modifications is generated and provided to a collaboration server via the browser channel at block 810. At block 812, server broadcast is received to indicate how the master copy of the model was modified at the modeling server in response to the modifications provided at block 810 and, in some cases, one or more other modifications submitted from other client devices. According to some scenarios, the modifications reported via the server broadcast are not the same as those applied at block 806. The modifications applied at block 806 in such cases may be undone and new modifications, consistent with the server broadcast received at block 812, are applied at block 814 to generate an approved modified version of the model data.

As a more specific example of operations that may be performed at blocks 806-814, the client device 252 of FIG. 3 may optimistically apply $Mutation_{C-1}$ to the model data 274 (i.e., to the local copy of a 3D model being collaboratively developed) prior to, or concurrently with, sending $Mutation_{C-1}$ to the server 256, but in any case before receiving the description of server modifications as $Mutation_{S-1}$ in a server broadcast. In some cases, $Mutation_{S-1}$ will reflect the same modifications as $Mutation_{C-1}$. In other cases, $Mutation_{S-1}$ and $Mutation_{C-1}$ will be different, in which case $Mutation_{S-1}$ will preempt $Mutation_{C-1}$.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 16 may include but is not limited to any combination of a LAN, a MAN, a WAN, a mobile, a wired or wireless network, a private network, or a virtual private network. Moreover, while only two client devices are illustrated in FIG. 1 to simplify and clarify the description, it is understood that any number of client computers or display devices are supported and can be in communication with the server 18.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map rendering system for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for providing a collaborative, browser-based development framework for 3D modeling through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A tangible non-transitory computer-readable medium storing instructions for collaborative three-dimensional (3D) modeling in a browser application that executes on one or more processors of a first computing device, the instructions comprising:
   a browser interface module that executes on the one or more processors to receive user commands from the browser application for modifying a 3D model and cause a rendering of the 3D model to be displayed in a window controlled by the browser application, wherein the 3D model includes model data having a plurality of components, each component having a plurality of elements;
   a modeling engine module that executes on the one or more processors to interpret model data corresponding to the 3D model to generate the rendering of the 3D model, and modify the model data in accordance with the received user commands; and
   a collaboration module that executes on the one or more processors to cause the modified 3D model to be synchronized in real time between the first computing device and a second computing device at which the 3D model is being concurrently developed, wherein to cause the modified 3D model to be synchronized between the first computing device and the second computing device, the collaboration module generates a serialized representation of a model component including an ordered listing of elements included in the model component, generates a description of a modification specified relative to the elements included in the model component, and provides the description of the modification to the browser interface module, and
   wherein the first computing device and the second computing device operate independently of each other on a communication network.

2. The computer-readable medium of claim 1, wherein the browser interface module causes the description of the modification to be transmitted via the communication network.

3. The computer-readable medium of claim 2, wherein the browser interface module causes the description to be transmitted to the second computing device.

4. The computer-readable medium of claim 2, wherein the browser interface module causes the description to be transmitted to a server operating on the communication network independently of the first computing device and the second computing device.

5. The computer-readable medium of claim 2, wherein the browser interface module creates a persistent communication channel via which the collaboration module receives in real time descriptions of modifications of the 3D model at the second computing device.

6. The computer-readable medium of claim 2, wherein:
   the modeling engine module modifies the model data in accordance with the received user commands to generate an initial modified version of the model data;
   in response to the transmitted description of the modification, the browser interface module receives a description of a modification applied at a server; and
   the modeling engine module modifies the model data in accordance with the received description of the modification applied at the server to generate an approved modified version of the model data.

7. The computer-readable medium of claim 1, wherein the modeling engine is provided as a compiled plugin that extends the functionality of the browser application.

8. The computer-readable medium of claim 7, wherein the collaboration module is provided as a script interpreted by the browser application at runtime.

9. The computer-readable medium of claim 1, wherein the modeling engine and the collaboration module are provided as a script interpreted by the browser application at runtime.

10. The computer-readable medium of claim 1, wherein the collaboration model generates a lock message identifying the model component and user requesting the model component be locked for exclusive modification.

11. A computing device for collaborative development of 3D models, the computing device comprising:
   a network interface coupled to a communication network;
   one or more processors;

a memory coupled to the one or more processors;
a display device coupled to the one or more processors;
a browser application stored in the memory that executes on the one or more processors to retrieve content from remote hosts via the communications network interface and render the retrieved content on the display device; and
a 3D modeling software module stored in the memory that executes on the one or more processors, the 3D modeling software module including:
  a browser interface module configured to receive user commands from the browser application for modifying a 3D model and cause a rendering of the 3D model to be displayed in a window controlled by the browser application, wherein the 3D model includes model data having a plurality of components, each component having a plurality of elements;
  a modeling engine module configured to modify model data corresponding to the 3D model in accordance with the received user commands, wherein the model data is stored in the memory in a non-image format; and
  a collaboration module configured to generate an indication of the modified model data to be transmitted via the communication network to cause the modified 3D model to be synchronized in real time with another computing device at which the 3D model is being concurrently developed, wherein to cause the modified 3D model to be synchronized with the another computing device, the collaboration module generates a serialized representation of a model component including an ordered listing of elements included in the model component, generates a description of a modification specified relative to the elements included in the model component, and provides the description of the modification to the browser interface module.

12. The computing device of claim 11, wherein the modeling engine is further configured to interpret the model data corresponding to the 3D model to generate the rendering of the 3D model.

13. The computing device of claim 11, wherein the browser interface module includes instructions in a scripting language interpretable by the browser application at runtime, wherein the instructions cause a plurality of interactive controls for manipulating component shapes to be displayed within the window.

14. The computing device of claim 11, wherein the browser interface module creates a persistent communication channel via which the collaboration module receives in real time indications of modifications of the 3D model at the other computing device.

15. The computing device of claim 11, wherein:
the modeling engine includes compiled instructions, and
the collaboration module includes instructions in a scripting language interpretable by the browser application at runtime.

16. The computing device of claim 11, wherein:
the modeling engine module modifies the model data in accordance with the received user commands to generate an initial modified version of the model data;
in response to the transmitted indication of the modification, the browser interface module receives a description of a modification applied at a server; and
the module engine module modifies the model data in accordance with the received description of the modification applied at the server to generate an approved modified version of the model data.

17. A method for browser-based collaborative development of a 3D model in a computing device operating on a communication network and having a memory and one or more processors, wherein model data corresponding to the 3D model is stored in a non-image format in the memory, and wherein the 3D model includes a plurality of components, each component having a plurality of elements, the method comprising:
receiving, via a user interface of a browser application, a user command for modifying model data corresponding to at least one component of a 3D model;
modifying the model data in accordance with the user command, including modifying respective portions of the model data to change one or more of dimensionality, positioning, and color of at least one of the plurality of elements;
automatically generating a serialized representation of the at least one component, wherein the serialized representation of the at least one component includes an ordered listing of elements included in the at least one component;
automatically generating a description of the modification specified relative to the ordered listing of elements included in the at least one component of the model data; and
automatically causing the description of the modification of the model data to be
transmitted via the browser application in an electronic message to another device operating on the communication network, including not receiving a user command to transmit the description of the modification from the user interface;
  whereby the 3D model is synchronized between the computing device and at least one other device at which the 3D model is being concurrently developed.

18. The method of claim 17, further comprising:
interpreting the modified model data to generate a representation of the modified 3D model in an image format; and
causing the representation of the modified 3D model to be displayed via the user interface.

19. The method of claim 17, wherein automatically causing the description of the modification of the model data to be transmitted includes causing the description of the modification of the model data to be transmitted to a collaboration server that synchronizes modifications of the 3D model between the computing device and the at least one other device.

20. The method of claim 17, further comprising causing the browser application to create a persistent communication channel to receive real-time indications of modifications of the 3D model at other devices.

21. The method of claim 17, wherein modifying the model data in accordance with the user command includes generating an initial modified version of the model data; the method further comprising:
receiving a description of a modification applied at a collaboration server; and
modifying the model data in accordance with the received description of the modification applied at the server to generate an approved modified version of the model data.

* * * * *